(12) United States Patent
Wei et al.

(10) Patent No.: US 12,055,695 B2
(45) Date of Patent: Aug. 6, 2024

(54) WIDE-ANGLE LENS, CAMERA MODULE AND CAMERA

(71) Applicant: JIANGXI LIANCHUANG ELECTRONIC CO., LTD., Nanchang (CN)

(72) Inventors: Wenzhe Wei, Nanchang (CN); Xuming Liu, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 1028 days.

(21) Appl. No.: 16/984,083

(22) Filed: Aug. 3, 2020

(65) Prior Publication Data

US 2021/0055527 A1 Feb. 25, 2021

Related U.S. Application Data

(63) Continuation of application No. PCT/CN2020/084671, filed on Apr. 14, 2020.

(30) Foreign Application Priority Data

Aug. 20, 2019 (CN) .......................... 201910766858.1

(51) Int. Cl.
*G02B 13/18* (2006.01)
*G02B 9/12* (2006.01)
*G02B 13/06* (2006.01)

(52) U.S. Cl.
CPC ............... *G02B 13/06* (2013.01); *G02B 9/12* (2013.01); *G02B 13/18* (2013.01)

(58) Field of Classification Search
CPC ... G02B 9/00; G02B 9/12; G02B 9/64; G02B 13/00; G02B 13/001; G02B 13/0015;
(Continued)

(56) References Cited

U.S. PATENT DOCUMENTS 9,116,325 B2 * 8/2015 Yamada ............. G02B 13/0045
9,645,364 B2 * 5/2017 Okada .................... G02B 13/06
(Continued)

FOREIGN PATENT DOCUMENTS

CN          104007535 A       8/2014
CN          204009204 U      12/2014
(Continued)

OTHER PUBLICATIONS

International search report issued in a corresponding International application No. PCT/CN2020/084671, mailed on Jul. 2, 2020 (10 pages).
(Continued)

*Primary Examiner* — Thong Q Nguyen

(57) ABSTRACT

Provided are a wide-angle lens, a camera module having a wide-angle lens, and a camera having a camera module having a wide-angle lens. A first group includes a first lens and a second lens each having a negative refractive power. A second group includes a third lens and a fourth lens each having a positive refractive power. The third group includes a fifth lens and a sixth lens each having a positive refractive, a seventh lens having a negative refractive power, and an eighth lens having a positive refractive power, the sixth lens and the seventh lens form a cemented body. The wide-angle lens, the camera module and the camera adopt eight glass lenses.

17 Claims, 14 Drawing Sheets

(58) Field of Classification Search
CPC .................... G02B 13/002; G02B 13/0045;
G02B 13/006; G02B 13/008; G02B
13/06; G02B 13/14; G02B 13/143; G02B
13/146; G02B 13/18
USPC .................. 359/689, 708, 749, 750, 754
See application file for complete search history.

(56) References Cited

U.S. PATENT DOCUMENTS

| | | | |
|---|---|---|---|
| 2017/0248775 A1* | 8/2017 | Shih | G02B 9/64 |
| 2018/0172963 A1* | 6/2018 | Kim | G02B 13/18 |
| 2018/0372998 A1 | 12/2018 | Pao et al. | |
| 2021/0055519 A1* | 2/2021 | Wei | G02B 13/006 |
| 2021/0055527 A1* | 2/2021 | Wei | G02B 9/12 |

FOREIGN PATENT DOCUMENTS

| | | | |
|---|---|---|---|
| CN | 107167898 A | | 9/2017 |
| CN | 206906677 U | | 1/2018 |
| CN | 108469667 A | | 8/2018 |
| CN | 108519660 A | | 9/2018 |
| CN | 109143534 A | * | 1/2019 |
| CN | 110609378 A | | 12/2019 |
| CN | 110618520 A | | 12/2019 |

OTHER PUBLICATIONS

Written opinion of the international search authority issued in a corresponding International application No. PCT/CN2020/084671, mailed on Jul. 2, 2020 (3 pages).

SIPO, First Office Action for CN Application No. 2019107668581, Mar. 9, 2021.

* cited by examiner

WIDE-ANGLE LENS, CAMERA MODULE AND CAMERA

CROSS REFERENCE TO RELATED APPLICATION(S)

This application is a continuation of PCT Application Serial No. PCT/CN2020/084671, filed on Apr. 14, 2020, which entitled "WIDE-ANGLE LENS AND IMAGING DEVICE". The PCT application claims priority to a Chinese application No. 201910766858.1, filed on Aug. 20, 2019, titled "WIDE-ANGLE LENS AND IMAGING DEVICE". The entirety of the above-mentioned application is hereby incorporated by reference herein.

TECHNICAL FIELD

The present disclosure relates to the field of lens imaging technologies, and more particularly, to a wide-angle lens, a camera module having a wide-angle lens, and a camera having a camera module having a wide-angle lens.

BACKGROUND

With the development of optical lens imaging technologies, cameras used in the fields of video surveillance, sports cameras, vehicle cameras, etc., are required to have a wider field of view, more light flux and higher imaging quality, so it is needed to provide a lens, which is capable of providing large field of view, large aperture and high imaging quality, to improve the monitoring and imaging capabilities thereof.

SUMMARY

The objects of the disclosure are to provide a wide-angle lens, a camera module having a wide-angle lens, and a camera having a camera module having a wide-angle lens.

In a first aspect, the present disclosure provides a wide-angle lens, from an object side to an imaging surface, the wide-angle lens sequentially includes: a first group with a negative refractive power, a second group with a positive refractive power, a stop, a third group with a positive refractive power and a filter. The first group includes a first lens and a second lens from the object side to the image side, wherein the first lens has a negative refractive power, a convex object side surface and a concave image side surface, the second lens has a negative refractive power and a concave image side surface. The second group includes a third lens and a fourth lens from the object side to the image side, wherein the third lens has a positive refractive power and a convex image side surface, the fourth lens has a positive refractive power, a concave object side surface, and a convex image side surface. The third group includes a fifth lens, a sixth lens, a seventh lens, an eighth lens from the object side to the image side, wherein the fifth lens has a positive refractive power and a convex image side surface, the sixth lens has a positive refractive power and a convex image side surface, the seventh lens has a negative refractive power, a concave object side surface and a concave image side surface, the eighth lens has a positive refractive power, a convex object side surface and a convex image side surface, the sixth lens and the seventh lens form a cemented body. The stop is disposed between the second group and the third group. The filter is disposed between the third group and the imaging surface. The first lens, the second lens, the third lens, the fourth lens, the fifth lens, the sixth lens, the seventh lens and the eighth lens are all glass lenses, and the wide-angle lens meets the expressions:

$$r_7/f_7 + r_8/f_8 = 0;$$

$$0 < r_7/f_7 - r_8/f_8 < 2;$$

where $r_7$ represents a radius of curvature of the object side surface of the fourth lens, $r_8$ represents a radius of curvature of the image side surface of the fourth lens, $f_7$ represents a focal length of the object side surface, i.e., a front focal length (FFL), of the fourth lens, $f_8$ represents a focal length of the image side surface, i.e., a back focal length (BFL), of the fourth lens.

In a third aspect, the present disclosure provides a camera module. The camera module includes the wide-angle lens as mentioned in the first aspect, an image sensor, a barrel, and a holder. The wide-angle lens is received in the barrel, and the barrel is engaged with the holder. The image sensor is substantially accommodated in the holder and located on an imaging surface of the wide-angle lens. The image sensor is configured for converting light signals into electrical signals, thereby the images formed by the wide-angle lens can be converted and transmitted to a processor.

In a fourth aspect, the disclosure provides a camera, which includes a camera module as mentioned above, a processor, and a memory, wherein the camera module is configured to capture images, the processor is configured to process the captured images, and the memory is configured to store the captured images.

Compared with the related art, the wide-angle lens, the camera module, the camera and the imaging device provided by the present disclosure has the characteristics of wide field of view and large aperture and higher image quality. The first group is mainly used for receiving lights and reducing the angle between the lights and the optical axis, so that the lights are nearly parallel to the optical axis after passing through the first group, which is beneficial to increase the relative aperture of the wide-angle lens. The second group is mainly used for light convergence, and correction of aberrations such as spherical aberration and coma. The third group is mainly used to eliminate the effect of chromatic aberration, field aberration, and spherical aberration, and control the exit angle of the main ray.

These or other aspects of the disclosure will become apparent and understandable in the description of the following embodiments.

REFERENCE NUMERALS OF MAIN COMPONENTS

Figure 1:
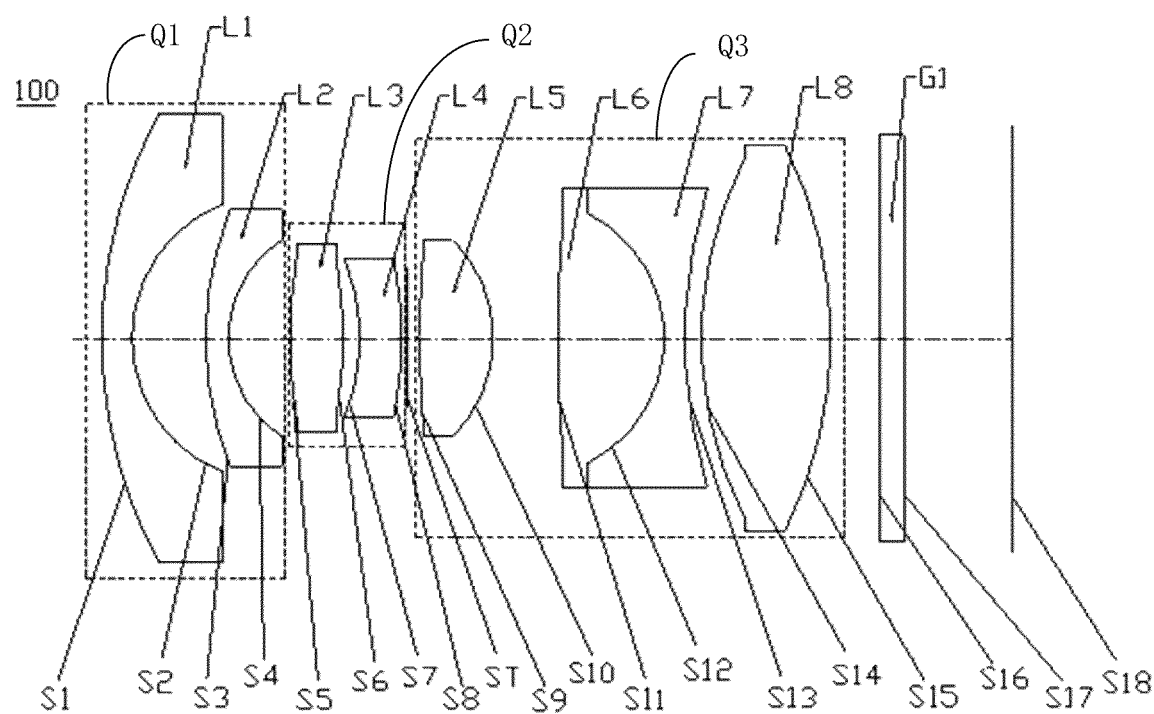
FIG. 1 is a schematic structural diagram of a wide-angle lens in a first embodiment of the disclosure.
Figure 2:
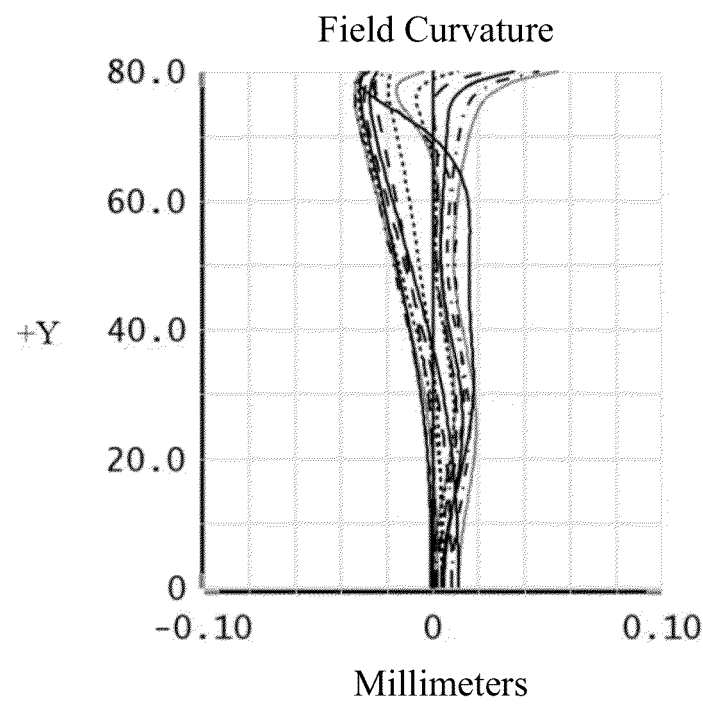
FIG. 2 is a field curvature diagram of the wide-angle lens in the first embodiment of the disclosure.
Figure 3:
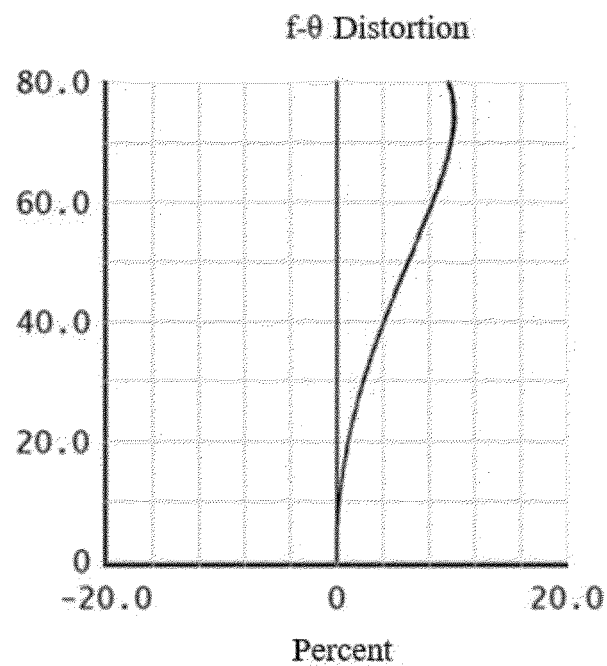
FIG. 3 is a distortion diagram of the wide-angle lens in the first embodiment of the disclosure.
Figure 4:
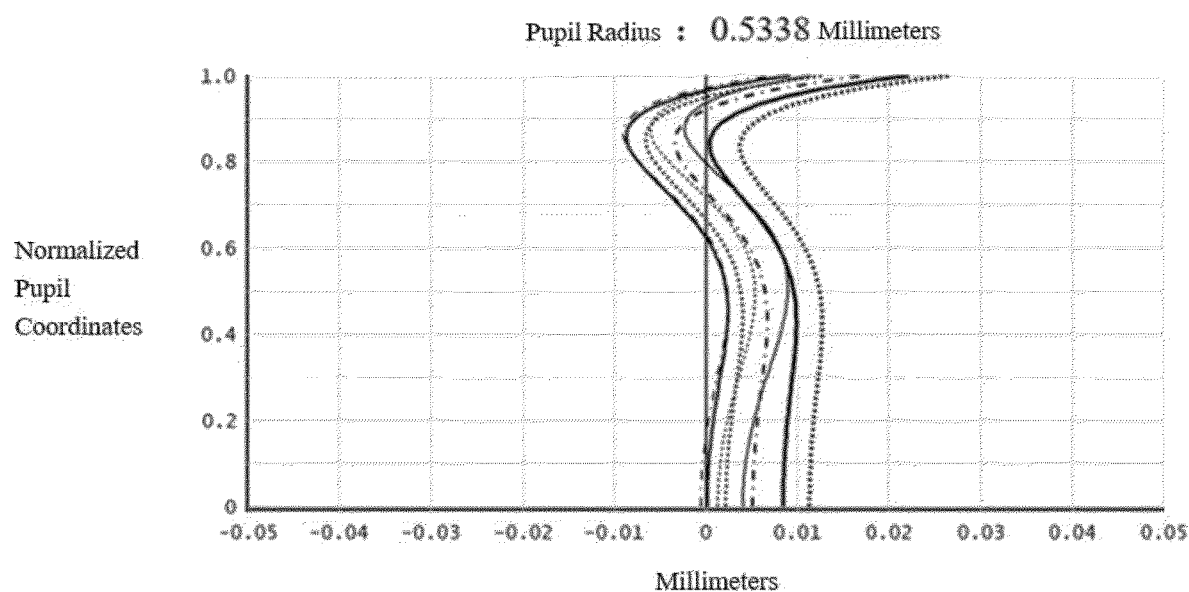
FIG. 4 is an axial chromatic aberration diagram of the wide-angle lens in the first embodiment of the disclosure.
Figure 5:
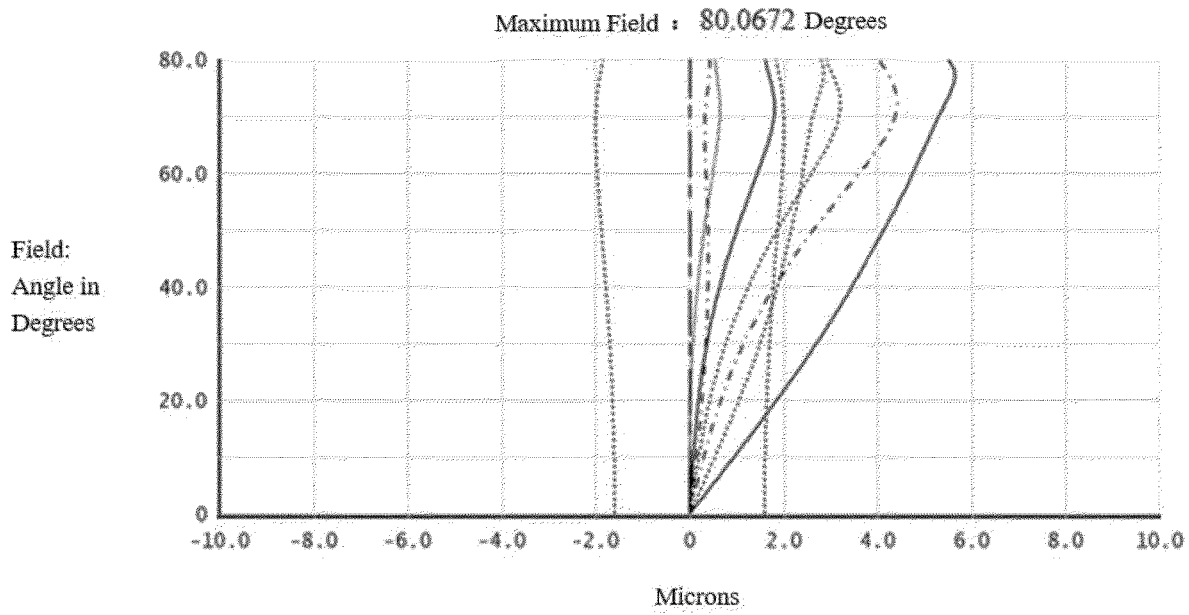
FIG. 5 is a lateral chromatic aberration diagram of the wide-angle lens in the first embodiment of the disclosure.

| First group | Q1 | Second group | Q2 |
| --- | --- | --- | --- |
| Third group | | Q3 | |
| First lens | L1 | Second lens | L2 |
| Third lens | L3 | Fourth lens | L4 |
| Fifth lens | L5 | Sixth lens | L6 |
| Seventh lens | L7 | Eighth lens | L8 |
| Stop | ST | Filter | G1 |
| Object side surface of the first lens | S1 | Image side surface of the first lens | S2 |
| Object side surface of the second lens | S3 | Image side surface of the second lens | S4 |
| Object side surface of the third lens | S5 | Image side surface of the third lens | S6 |
| Object side surface of the fourth lens | S7 | Image side surface of the fourth lens | S8 |
| Object side surface of the fifth lens | S9 | Image side surface of the fifth lens | S10 |
| Object side surface of the sixth lens | S11 | Image side surface of the sixth lens | S12-1 |
| Object side surface of the seventh lens | S12-2 | Image side surface of the seventh lens | S13 |
| Bonding surface of the sixth lens and the seventh lens | S12 | Object side surface of the eighth lens | S14 |
| Image side surface of the eighth lens | S15 | Object side surface of the filter | S16 |
| Image side surface of the filter | S17 | Imaging surface | S18 |
| Imaging device | 600 | Imaging element | 610 |
| Wide-angle lens | | 100, 200, 300, 400, 500 | |
| Camera module | 700 | Camera | 800 |
| Barrel | 701 | Holder | 702 |
| Image sensor | 703 | Printed circuit board | 704 |
| Processor | 801 | Memory | 802 |
| Car | 900 | | |

The following embodiments will further illustrate the present disclosure with reference to the above drawings.

DETAILED DESCRIPTION OF PREFERRED EMBODIMENTS

In order to better understand the disclosure, the disclosure will be further explained below with reference to the accompanying drawings. The drawings illustrate embodiments of the disclosure, but the disclosure is not limited to these embodiments. Instead, the purpose of providing these embodiments is to make the disclosure more thorough and comprehensive.

Unless defined otherwise, all technical and scientific terms used herein have the same meaning as commonly understood by one of ordinary skill in the art to which this invention belongs. The terminology used herein in the description of the present invention is only for the purpose of describing specific embodiments, and is not intended to limit the present disclosure. The term "and/or" as used herein includes any and all combinations of one or more of the associated listed items.

The disclosure provides a wide-angle lens, from an object side to an imaging surface, the wide-angle lens sequentially includes a first group with a negative refractive power, a second group with a positive refractive power, a stop, a third group with a positive refractive power and a filter. From the object side to an image side, the first group sequentially includes a first lens having a negative refractive and a second lens having a negative refractive power, an object side surface of the first lens is a convex surface, an image side surface of the first lens is a concave surface, an image side surface of the second lens is a concave surface. From the object side to the image side, the second group sequentially includes a third lens having a positive refractive power and a fourth lens having a positive refractive power, an object side surface of the third lens is a convex surface, an object side surface of the fourth lens is a concave surface, an image side surface of the fourth lens is a convex surface. From the object side to the image side, the third group sequentially includes a fifth lens having a positive refractive power, a sixth lens having a positive refractive power, a seventh lens having a negative refractive power and an eighth lens having a positive refractive power, an image side surface of the fifth lens is a convex surface, an image side surface of the sixth lens is a convex surface, an object side surface and an image side surface of the seventh lens are both concave surfaces, an object side surface and an image side surface of the eighth lens are both convex surfaces, the sixth lens and the seventh lens form a cemented body. The stop is disposed between the second group and the third group. The filter is disposed between the third group and the imaging surface. The first lens, the second lens, the third lens, the fourth lens, the fifth lens, the sixth lens, the seventh lens and the eighth lens are made of eight glass lenses, so that the wide-angle lens has better thermal stability, better mechanical strength, and better imaging effect.

In some embodiments, the wide-angle lens provided by the disclosure meets the expressions:

$$r_7/f_7+r_8/f_8=0; \quad (1)$$

$$0<r_7/f_7-r_8<2; \quad (2)$$

where $r_7$ represents a radius of curvature of the object side surface of the fourth lens, $r_8$ represents a radius of curvature of the image side surface of the fourth lens, $f_7$ represents a focal length of the object side surface, i.e., a front focal length, of the fourth lens, fs represents a focal length of the image side surface, i.e., a back focal length, of the fourth lens The above expressions (1) and (2) appropriately define the surface shape of the fourth lens. Satisfying the expressions (1) and (2), the fourth lens can effectively correct spherical aberration and coma and improve the lens resolution.

In some embodiments, the wide-angle lens provided by the disclosure meets the expression:

$$-2<r_{10}/f_{10}+r_{12}/f_{12}<0; \quad (3)$$

where $r_{10}$ represents a radius of curvature of the image side surface of the fifth lens, $r_{12}$ represents a radius of curvature of the image side surface of the sixth lens, $f_{10}$ represents a focal length of the image side surface, i.e., a back focal length, of the fifth lens, $f_{12}$ represents a focal length of the image side surface, i.e., a back focal length, of the sixth lens.

Satisfying the expression (3), the image side surface of the fifth lens and the image side surface of the sixth lens can be controlled to bend towards the stop direction, the aberration of the image side surface of the two lenses can be effectively reduced, and the assembly yield of the wide-angle lens can be improved. In some embodiments, the wide-angle lens provided by the disclosure meets the expression:

$$-10<(r_2+r_4)/f_{Q1}<0; \quad (4)$$

where $r_2$ represents a radius of curvature of the image side surface of the first lens, $r_4$ represents a radius of curvature of the image side surface of the second lens, $f_{Q1}$ represents a focal length of the first group.

Satisfying the expression (4) can make the exit light is nearly parallel to the optical axis after passing through the first group, which is beneficial to increase the relative aperture of the wide-angle lens, increase the light flux of the wide-angle lens, and increase the relative illuminance of the wide-angle lens.

In some embodiments, the wide-angle lens provided by the disclosure meets the expression:

$$-10<(f_{L3}+f_{L4})/f_{Q2}<10; \quad (5)$$

where $f_{L3}$ represents a focal length of the third lens, $f_{L4}$ represents a focal length of the fourth lens, $f_{Q2}$ represents a focal length of the second group.

Satisfying the expression (5), it is beneficial to correct the curvature of field by the cooperation of the third lens and the fourth lens, meanwhile, it can ensure the refractive power of the second group, which is conducive to the correction of aberrations and avoids the generation of large advanced aberrations.

In some embodiments, the wide-angle lens provided by the disclosure meets the expression:

$$-1<r_{13}/f_{13}+r_{14}/f_{14}<0; \quad (6)$$

where $r_{13}$ represent a radius of curvature of the image side surface of the seventh lens, $r_{14}$ represents a radius of curvature of the object side surface of the eighth lens, $f_{13}$ represents a focal length of the image side surface, i.e., a back focal length, of the seventh lens, $f_{14}$ represents a focal length of the object side surface, i.e., a front focal length, of the eighth lens.

Satisfying the expression (6) is beneficial to avoid a particularly obvious ghost generated by the light being secondarily reflected between the seventh lens and the eighth lens. Meanwhile, the position of the ghost can be restrained to coincide with or close to a light source, so that the ghost can be blocked by the light source, thereby avoiding the ghost from adversely affecting the image quality.

In some embodiments, an object side surface of the second lens is convex or concave, which can effectively change the exit angle of the lights.

In some embodiments, an object side surface of the third lens is convex or concave, which can effectively change the exit angle of the lights.

In some embodiments, the second lens and the eighth lens of the wide-angle lens provided by the disclosure are both glass aspheric lenses. By using glass aspheric lenses can effectively correct the aberration of the wide-angle lens and improve the resolution of the entire group of lenses.

In some embodiments, the wide-angle lens provided by the disclosure meets the expression:

$$d_1>d_2>>d_3>d_4; \quad (8)$$

$$d_8>d_7>d_5; \quad (9)$$

where $d_1$ represents the maximum diameter of the first lens, $d_2$ represents the maximum diameter of the second lens, $d_3$ represents the maximum diameter of the third lens, $d_4$ represents the maximum diameter of the fourth lens, $d_8$ represents the maximum diameter of the eighth lens, $d_7$ represents the maximum diameter of the seventh lens, $d_5$ represents the maximum diameter of the fifth lens.

In some embodiments, the wide-angle lens provided by the disclosure meets the expressions:

$$2\theta>150°; \quad (10)$$

$$TTL\leq18 \text{ mm}; \quad (11)$$

where $2\theta$ represents a field of view of the wide-angle lens, TTL represents a total optical length of the wide-angle lens.

The present disclosure further provides an imaging device, including the wide-angle lens according to any of the above embodiments and an imaging element, the imaging element is configured for converting optical images formed by the wide-angel lens into electrical signals.

The present disclosure further provides a camera module, including the wide-angle lens according to any of the above embodiments and an image sensor located on an imaging surface of the wide-angle lens.

The present disclosure further provides a camera, which includes a camera module as mentioned above, a processor, and a memory, wherein the camera module is configured to capture images, the processor is configured to process the captured images, and the memory is configured to store the captured images.

Satisfying the above-mentioned embodiments is beneficial to ensure that the wide-angle lens, the camera module, the camera and the imaging device have the characteristics of wide field of view, large aperture, and high imaging quality.

The shapes of aspheric surfaces of the wide-angle lens provided by the embodiments of the present disclosure satisfy the following equation:

$$z = \frac{ch^2}{1+\sqrt{1-(1+K)c^2h^2}} + Bh^4 + Ch^6 + Dh^8 + Eh^{10} + Fh^{12},$$

where z represents a vector height between a position on the surface and a vertex of the surface along an optical axis of the lens, c represents a curvature of the vertex of the surface, K represents a quadratic surface coefficient, h represents a distance between the position on the surface and the optical axis, B represents a fourth order surface coefficient, C represents a sixth order surface coefficient, D represents an eighth order surface coefficient, E represents a tenth order surface coefficient, F represents a twelfth order surface coefficient.

In each of the following embodiments, the thickness, the radius of curvature and the material of each lens in the wide-angle lens are different. Details can be referred to the parameter table of each embodiment.

First Embodiment

Please refer to FIG. 1, which is a structural diagram of a wide-angle lens 100 provided in a first embodiment of the disclosure. From an object side to an imaging surface, the wide-angle lens 100 sequentially includes a first group Q1, a second group Q2, a stop ST, a third group Q3, and a filter G1.

The first group Q1 has a negative refractive power, and the first group Q1 sequentially includes a first lens L1 having a negative refractive power and a second lens L2 having a negative refractive power. An object side surface S1 of the first lens L1 is a convex surface, an image side surface S2 of the first lens L1 is a concave surface, an object side surface S3 of the second lens L2 is a convex surface, an image side surface S4 of the second lens L2 is a concave surface.

The second group Q2 has a positive refractive power, and the second group Q2 sequentially includes a third lens L3 having a positive refractive power and a fourth lens L4 having a positive refractive power. An object side surface S5 of the third lens L3 and an image side surface S6 of the third lens L3 are both convex surfaces, an object side surface S7 of the fourth lens L4 is a concave surface, an image side surface S8 of the fourth lens L4 is a convex surface.

The third group Q3 has a positive refractive power, and the third group Q3 sequentially includes a fifth lens L5 having a positive refractive power, a sixth lens L6 having a positive refractive power, a seventh lens L7 having a negative refractive power and an eighth lens L8 having a positive refractive power. The sixth lens L6 and the seventh lens L7 form a cemented body, specifically, an image side surface S12-1 of the sixth lens L6 is adhered to an object side surface S12-2 of the seventh lens L7, that is, the image side surface S12-1 of the sixth lens L6 and the object side surface S12-2 of the seventh lens L7 are seamless bonded to form a bonded surface S12. An object side surface S9 of the fifth lens L5 and an image side surface S10 of the fifth lens L5 are both convex surfaces, an object side surface S11 of the sixth lens L6 and the image side surface S12-1 of the sixth lens L6 are both convex surfaces, the object side surface S12-2 of the seventh lens L7 and an image side surface S13 of the seventh lens L7 are both concave surface, an object side surface S14 of the eighth lens L8 and an image side surface S15 of the eighth lens L8 are both convex surfaces.

The stop ST is disposed between the second group Q2 and the third group Q3, specifically, the stop ST is disposed between the fourth lens L4 and the fifth lens L5.

The filter G1 is disposed between the third group Q3 and the imaging surface.

The first lens L1, the second lens L2, the third lens L3, the fourth lens L4, the fifth lens L5, the sixth lens L6, the seventh lens L7 and the eighth lens L8 of the wide-angle lens 100 provided by the embodiment are made of the material of glass. The second lens L2, the fourth lens L4 and the eighth lens L8 are all glass aspheric lens.

Related parameters of each lens of the wide-angle lens 100 provided by this embodiment are shown in Table 1.

TABLE 1

| Surface No. | Surface type | Radius of curvature (mm) | Thickness (mm) | Refractive index | Abbe number |
|---|---|---|---|---|---|
| Object surface | Object surface | Infinity | Infinity | | |
| S1 | Spherical surface | 8.870264 | 0.596515 | 1.901 | 37.05 |
| S2 | Spherical surface | 2.751619 | 1.455882 | | |
| S3 | Aspheric surface | 9.509213 | 0.445883 | 1.497 | 81.52 |
| S4 | Aspheric surface | 2.350220 | 1.215683 | | |
| S5 | Spherical surface | 9.922567 | 1.048366 | 1.741 | 27.76 |
| S6 | Spherical surface | −10.145852 | 0.338342 | | |
| S7 | Aspheric surface | −3.183529 | 0.834321 | 1.882 | 37.22 |
| S8 | Aspheric surface | −4.823401 | 0.116730 | | |
| ST | Plane | Infinity | 0.205225 | | |
| S9 | Spherical surface | 14.497137 | 1.476363 | 1.487 | 70.42 |
| S10 | Spherical surface | −2.660256 | 1.266378 | | |
| S11 | Spherical surface | 23.855248 | 2.114756 | 1.593 | 68.53 |
| S12 | Spherical surface | −2.668247 | 0.407893 | 1.717 | 29.51 |
| S13 | Spherical surface | 9.566781 | 0.326896 | | |
| S14 | Aspheric surface | 6.638894 | 2.550988 | 1.497 | 81.52 |
| S15 | Aspheric surface | −5.639974 | 0.953293 | | |
| S16 | Spherical surface | Infinity | 0.500000 | 1.517 | 64.21 |
| S17 | Spherical surface | Infinity | 2.146617 | | |
| S18 | Imaging surface | Infinity | 0.000000 | | |

The parameters of the aspheric surfaces of each lens of this embodiment are shown in Table 2.

TABLE 2

| Surface No. | K | B | C | D | E | F |
|---|---|---|---|---|---|---|
| S3 | 6.901711 | 2.108688E−02 | −6.881806E−03 | 1.324731E−03 | −1.560346E−04 | 7.126790E−06 |
| S4 | 0.229424 | 2.449015E−02 | −6.811981E−03 | −1.510476E−04 | 5.309040E−04 | −1.294820E−04 |
| S7 | −2.227713 | 6.454669E−03 | 3.090099E−04 | 8.526619E−05 | −1.072658E−04 | 0.000000E+00 |
| S8 | −7.955876 | 5.125908E−03 | 2.238368E−03 | −1.679246E−04 | 6.568671E−05 | 0.000000E+00 |
| S14 | 0.730252 | −1.208753E−03 | 1.485025E−04 | −2.132878E−05 | 1.570082E−06 | −7.575441E−08 |
| S15 | −0.532597 | 2.878073E−03 | 3.975282E−05 | −3.971181E−06 | 4.444279E−07 | −5.011984E−08 |

In this embodiment, the field curvature, the distortion, the axial chromatic aberration, and the lateral chromatic aberration are shown in FIG. 2, FIG. 3, FIG. 4, and FIG. 5, respectively. As can be seen from FIG. 2 to FIG. 5, the field curvature, the distortion, the axial chromatic aberration and the lateral chromatic aberration can be well corrected in this embodiment.

Second Embodiment

Figure 6:
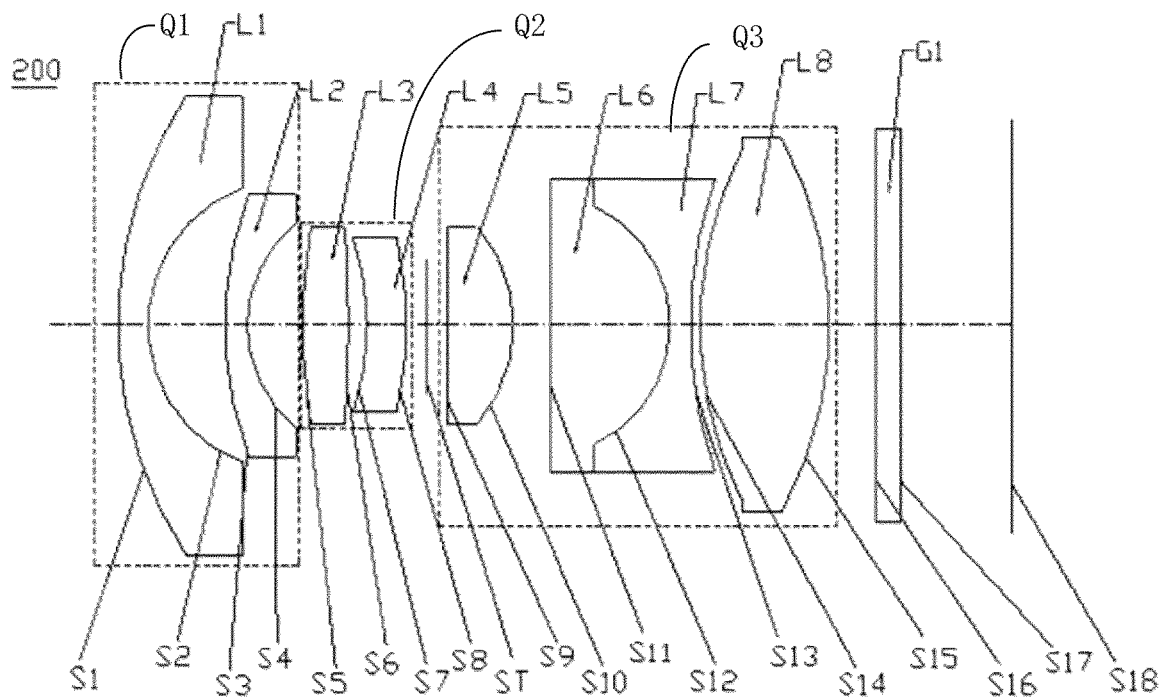
FIG. 6 is a schematic structural diagram of a wide-angle lens in a second embodiment of the disclosure.
Figure 7:
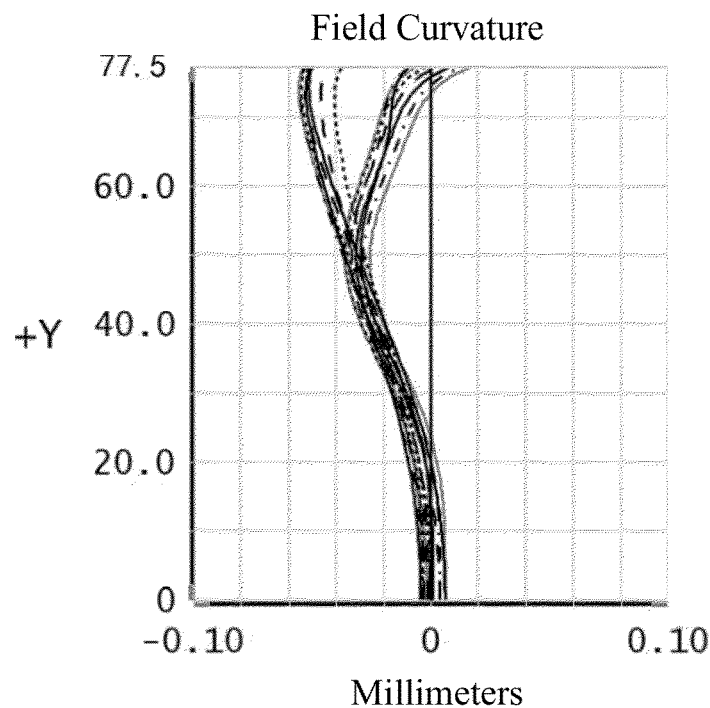
FIG. 7 is a field curvature diagram of the wide-angle lens in the second embodiment of the disclosure.
Figure 8:
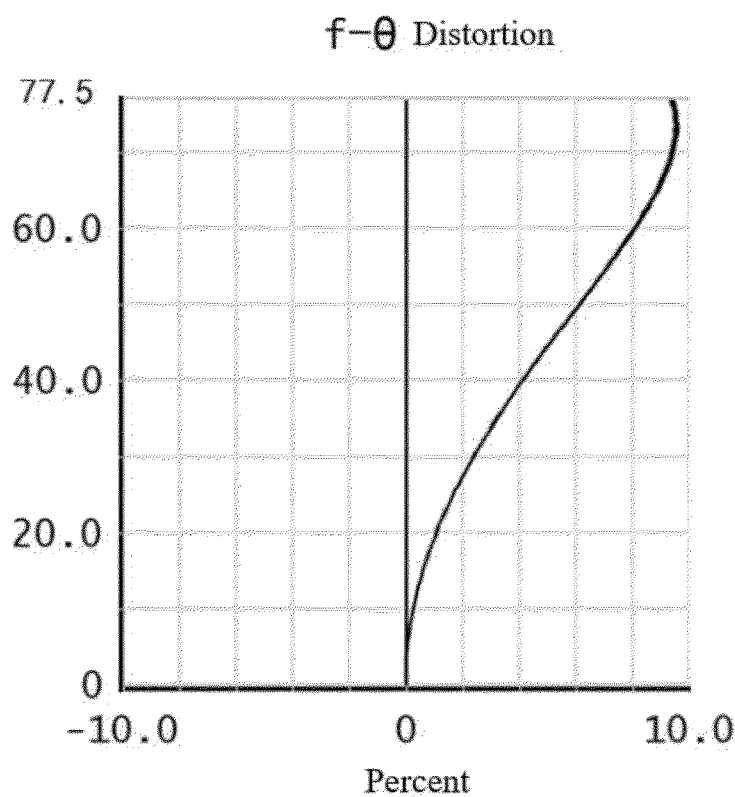
FIG. 8 is a distortion diagram of the wide-angle lens in the second embodiment of the disclosure.
Figure 9:
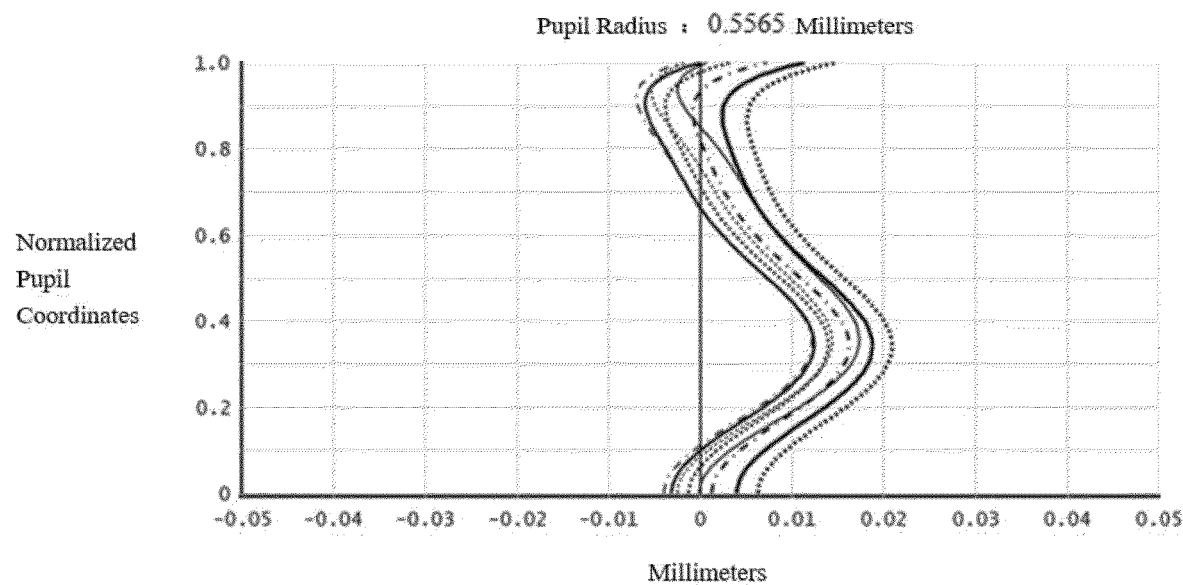
FIG. 9 is an axial chromatic aberration diagram of the wide-angle lens in the second embodiment of the disclosure.
Figure 10:
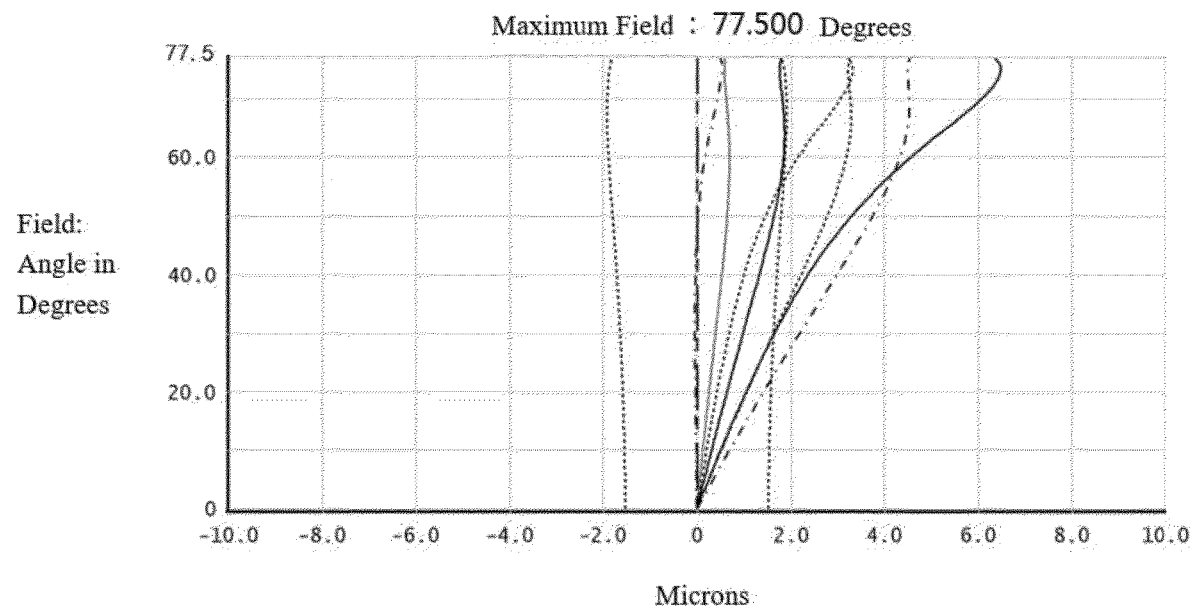
FIG. 10 is a lateral chromatic aberration diagram of the wide-angle lens in the second embodiment of the disclosure.

Please refer to FIG. 6, which is a structural diagram of a wide-angle lens 200 provided in this embodiment. The wide-angle lens 200 in this embodiment is substantially similar to the wide-angle lens 100 in the first embodiment expect that: an object side surface S11 of a sixth lens L6 of the wide-angle lens 200 in this embodiment is a concave surface, and the radius of curvature and the materials of each lens are different.

Related parameters of each lens of the wide-angle lens 200 of this embodiment are shown in Table 3.

TABLE 3

| Surface No. | Surface type | Radius of curvature (mm) | Thickness (mm) | Refractive index | Abbe number |
|---|---|---|---|---|---|
| Object surface | Object surface | Infinity | Infinity | | |
| S1 | Spherical surface | 8.176829 | 0.599863 | 1.804 | 46.57 |
| S2 | Spherical surface | 2.879905 | 1.546057 | | |
| S3 | Aspheric surface | 6.698856 | 0.449512 | 1.808 | 40.92 |
| S4 | Aspheric surface | 2.526389 | 1.133132 | | |
| S5 | Spherical surface | 12.022153 | 0.920281 | 2.001 | 25.44 |
| S6 | Spherical surface | −26.099910 | 0.368919 | | |
| S7 | Aspheric surface | −3.841983 | 0.799964 | 1.882 | 37.22 |
| S8 | Aspheric surface | −4.474329 | 0.405374 | | |
| ST | Plane | Infinity | 0.376953 | | |
| S9 | Spherical surface | 45.991365 | 1.364538 | 1.603 | 65.46 |
| S10 | Spherical surface | −2.971206 | 0.760996 | | |
| S11 | Spherical surface | −90.590288 | 2.398270 | 1.593 | 68.53 |
| S12 | Spherical surface | −2.563547 | 0.399965 | 1.699 | 30.05 |
| S13 | Spherical surface | 8.641627 | 0.199929 | | |
| S14 | Aspheric surface | 6.500807 | 2.599480 | 1.554 | 71.72 |
| S15 | Aspheric surface | −5.575269 | 0.953293 | | |
| S16 | Spherical surface | Infinity | 0.500000 | 1.517 | 64.21 |
| S17 | Spherical surface | Infinity | 2.223573 | | |
| S18 | Imaging surface | Infinity | — | | |

The parameters of the aspheric surfaces of the lenses of this embodiment are shown in Table 4.

TABLE 4

| Surface No. | K | B | C | D | E | F |
|---|---|---|---|---|---|---|
| S3 | 0.000000 | 3.927147E−03 | −1.420322E−03 | 1.748562E−04 | −9.962939E−06 | 0 |
| S4 | 0.000000 | 4.299012E−03 | −1.765144E−03 | 4.729302E−05 | 2.659936E−05 | 0 |
| S7 | −11.715047 | −1.606079E−02 | 7.848420E−03 | −1.192158E−03 | 1.331235E−04 | 0 |

TABLE 4-continued

| Surface No. | K | B | C | D | E | F |
|---|---|---|---|---|---|---|
| S8 | −24.182787 | −2.032153E−02 | 1.423908E−02 | −3.721244E−03 | 6.545563E−04 | 0 |
| S14 | 0.000000 | −8.850485E−04 | 3.063142E−05 | −1.411668E−06 | −2.079808E−07 | 0 |
| S15 | 0.000000 | 3.201294E−03 | −3.647908E−05 | 6.725450E−06 | −6.392353E−07 | 0 |

In this embodiment, the field curvature, the distortion, the axial chromatic aberration, and the lateral chromatic aberration are shown in FIG. 7, FIG. 8, FIG. 9, and FIG. 10, respectively. As can be seen from FIG. 7 to FIG. 10, the field curvature, the distortion, the axial chromatic aberration and the lateral chromatic aberration can be well corrected in this embodiment.

Third Embodiment

Figure 11:
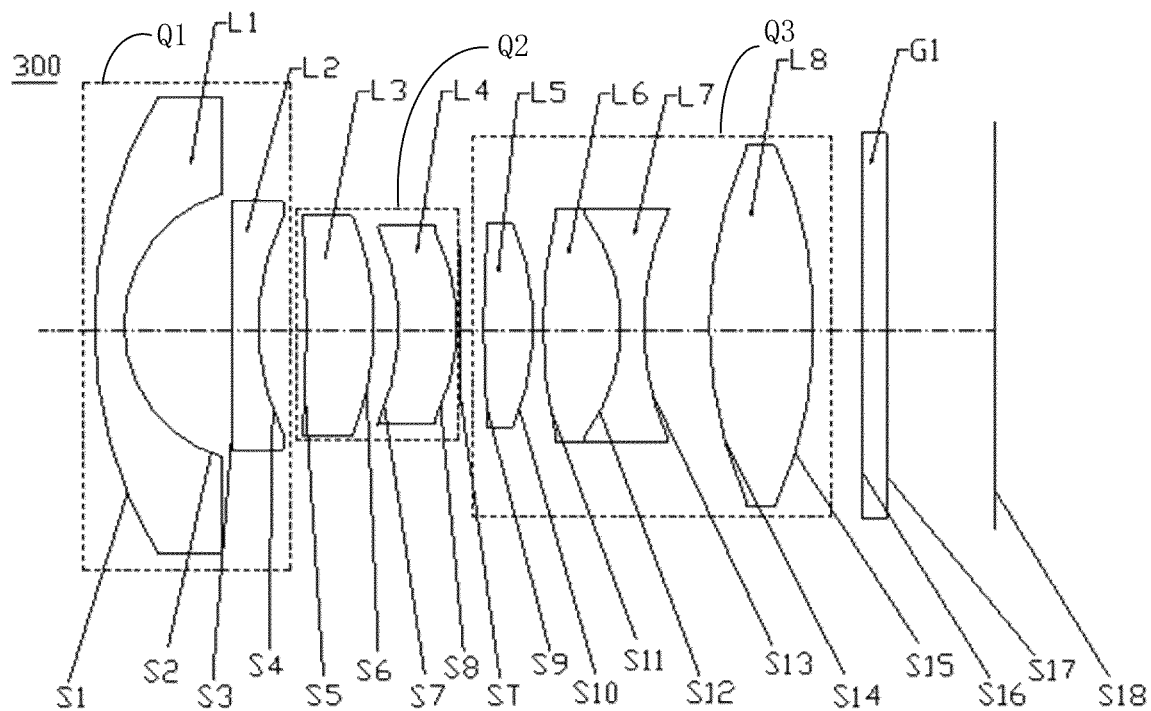
FIG. 11 is a schematic structural diagram of a wide-angle lens in a third embodiment of the disclosure.
Figure 12:
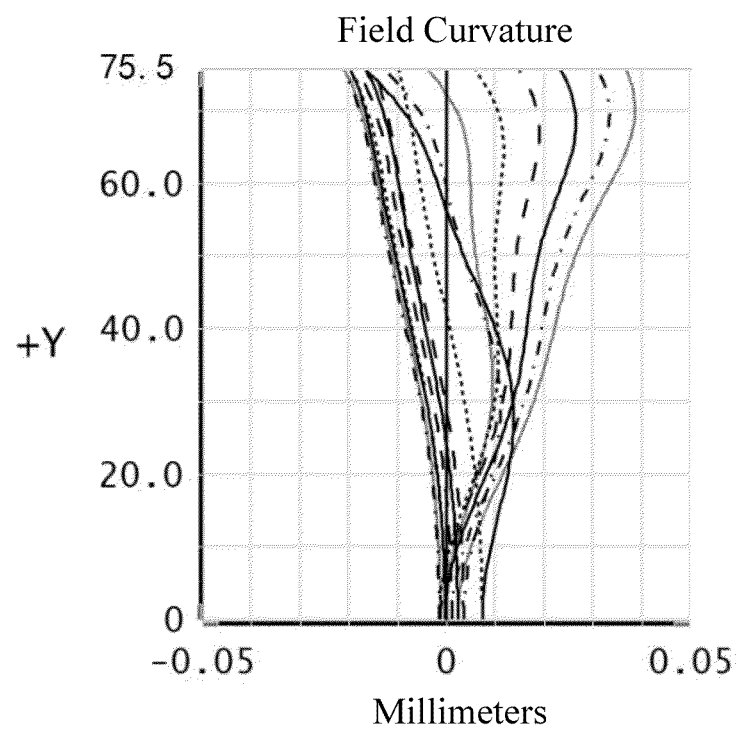
FIG. 12 is a field curvature diagram of the wide-angle lens in the third embodiment of the disclosure.
Figure 13:
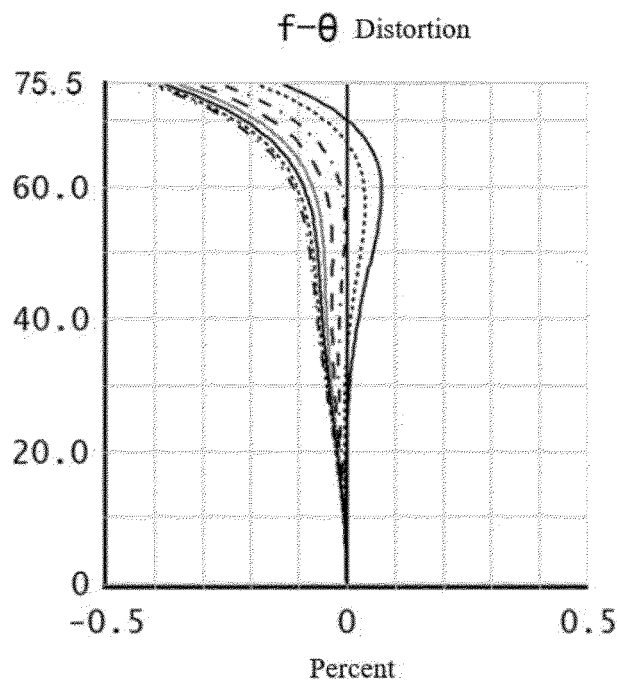
FIG. 13 is a distortion diagram of the wide-angle lens in the third embodiment of the disclosure.
Figure 14:
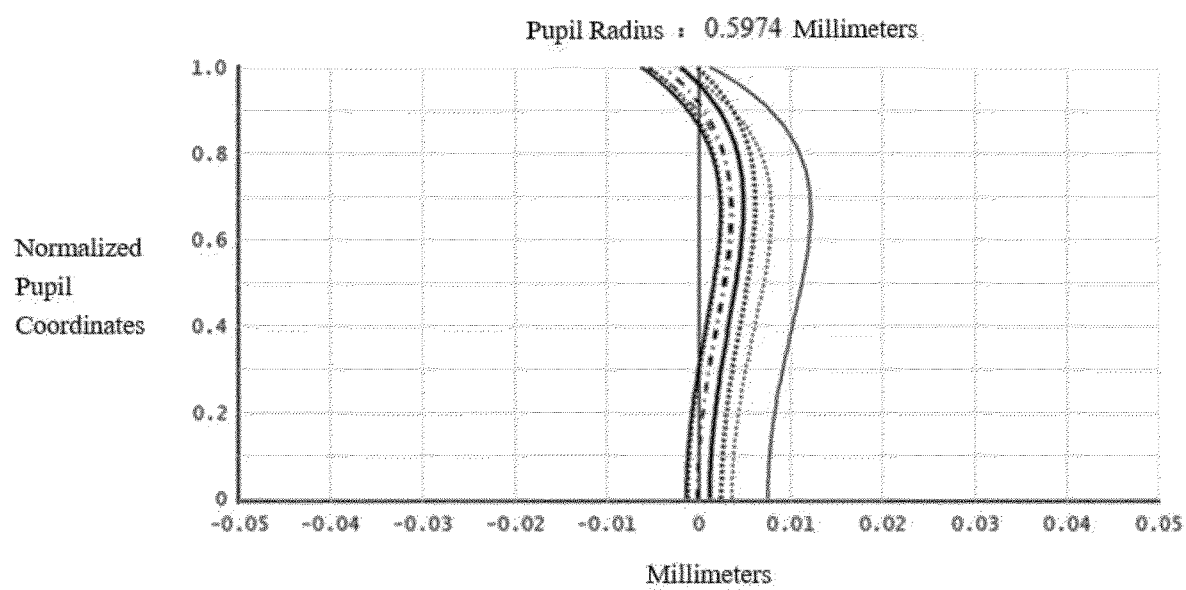
FIG. 14 is an axial chromatic aberration diagram of the wide-angle lens in the third embodiment of the disclosure.
Figure 15:
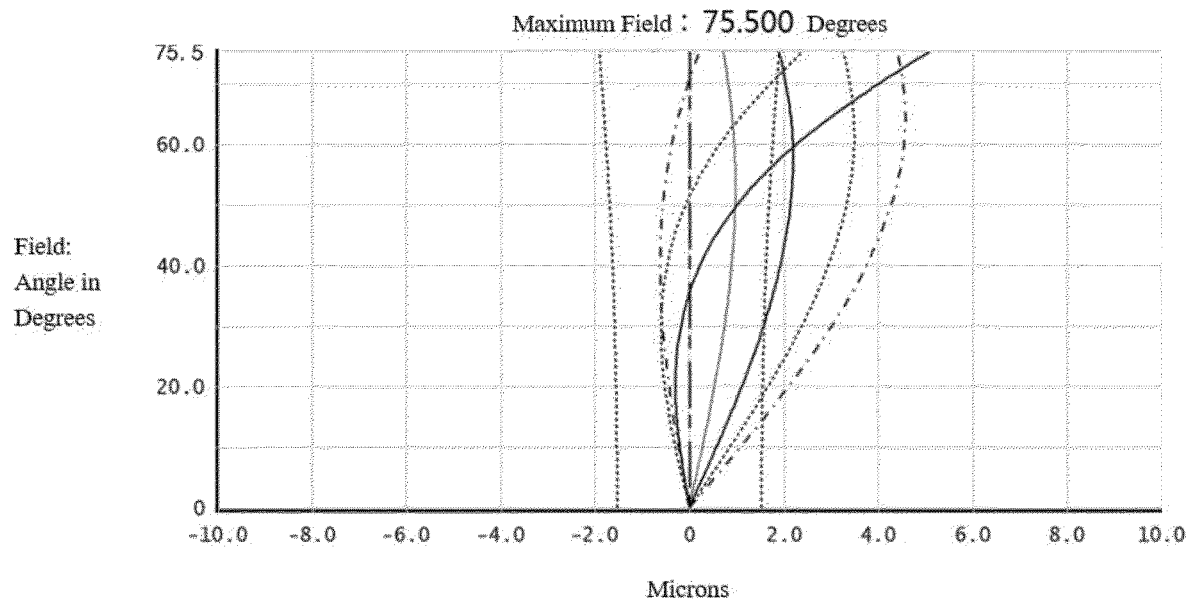
FIG. 15 is a lateral chromatic aberration diagram of the wide-angle lens in the third embodiment of the disclosure.

Please refer to FIG. 11, which is a structural diagram of a wide-angle lens 300 provided in this embodiment. The wide-angle lens 300 in this embodiment is substantially similar to the wide-angle lens 100 in the first embodiment expect that: in this embodiment, an object side surface S3 of a second lens L2 of the wide-angle lens 300 is a concave surface, an object side surface S5 of a third lens L3 is a concave surface, a fourth lens L4 is a glass spherical lens, and the radius of curvature and the materials of each lens are different.

Related parameters of each lens of the wide-angle lens 300 of this embodiment are shown in Table 5.

TABLE 5

| Surface No. | Surface type | Radius of curvature (mm) | Thickness (mm) | Refractive index | Abbe number |
|---|---|---|---|---|---|
| Object surface | Object surface | Infinity | Infinity | | |
| S1 | Spherical surface | 8.389255 | 0.594703 | 1.901 | 37.05 |
| S2 | Spherical surface | 2.640684 | 2.178842 | | |
| S3 | Aspheric surface | −20.917674 | 0.499869 | 1.808 | 40.92 |
| S4 | Aspheric surface | 9.571687 | 0.975091 | | |
| S5 | Spherical surface | −30.784896 | 1.351114 | 2.001 | 25.44 |
| S6 | Spherical surface | −5.551591 | 0.485863 | | |
| S7 | Spherical surface | −4.668915 | 1.174340 | 1.456 | 90.27 |
| S8 | Spherical surface | −3.965708 | 0.065449 | | |
| ST | Plane | Infinity | 0.455880 | | |
| S9 | Spherical surface | 22.880107 | 0.997632 | 1.593 | 68.53 |
| S10 | Spherical surface | −5.103306 | 0.198299 | | |
| S11 | Spherical surface | 9.204544 | 1.566909 | 1.593 | 68.53 |
| S12 | Spherical surface | −3.518912 | 0.444494 | 1.755 | 27.55 |
| S13 | Spherical surface | 5.296796 | 1.313238 | | |
| S14 | Aspheric surface | 7.097626 | 2.099295 | 1.497 | 81.52 |
| S15 | Aspheric surface | −7.921158 | 0.953293 | | |
| S16 | Spherical surface | Infinity | 0.500000 | 1.517 | 64.21 |
| S17 | Spherical surface | Infinity | 2.146186 | | |
| S18 | Imaging surface | Infinity | — | | |

The parameters of the aspheric surfaces of the lenses of this embodiment are shown in Table 6.

TABLE 6

| Surface No. | K | B | C | D | E | F |
|---|---|---|---|---|---|---|
| S3 | 0 | 1.194686E−02 | −2.323024E−03 | 1.820647E−04 | −5.466070E−06 | 0 |
| S4 | 0 | 1.882057E−02 | −1.736621E−03 | 7.442775E−05 | 1.044110E−05 | 0 |
| S14 | 0 | −1.385808E−03 | 6.923937E−05 | −3.568481E−06 | 1.671952E−08 | 0 |
| S15 | 0 | 4.574899E−04 | −2.198971E−05 | 3.854037E−06 | −2.717298E−07 | 0 |

In this embodiment, the field curvature, the distortion, the axial chromatic aberration, and the lateral chromatic aberration are shown in FIG. 12, FIG. 13, FIG. 14, and FIG. 15, respectively. As can be seen from FIG. 12 to FIG. 15, the field curvature, the distortion, the axial chromatic aberration and the lateral chromatic aberration can be well corrected in this embodiment.

Fourth Embodiment

Figure 16:
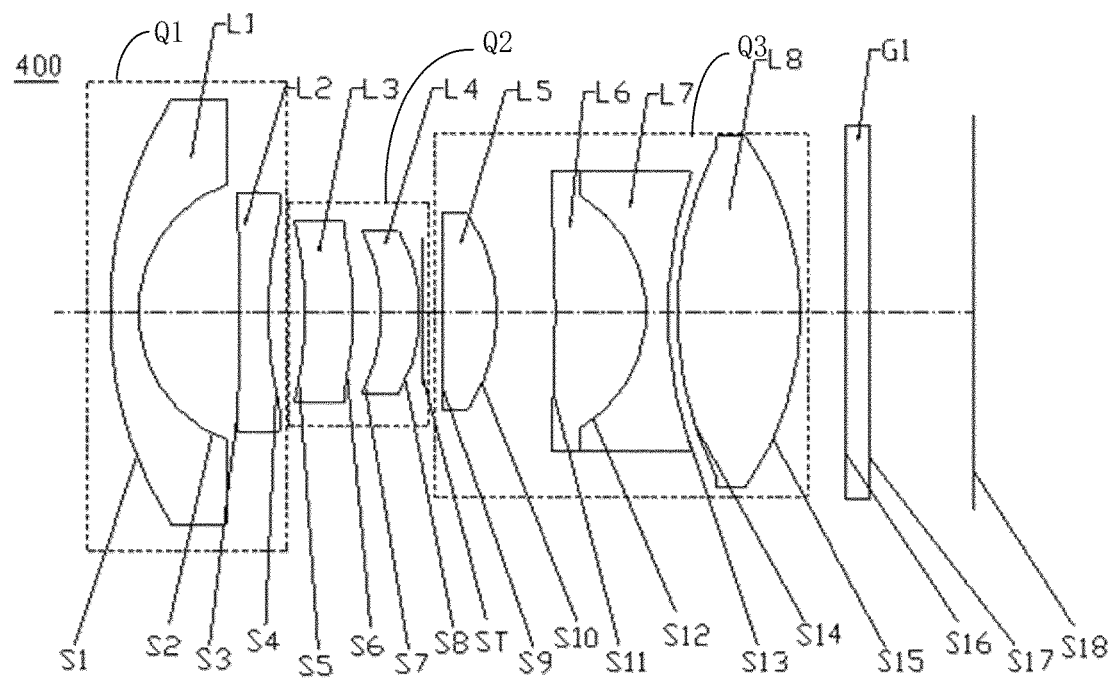
FIG. 16 is a schematic structural diagram of a wide-angle lens in a fourth embodiment of the disclosure.
Figure 17:
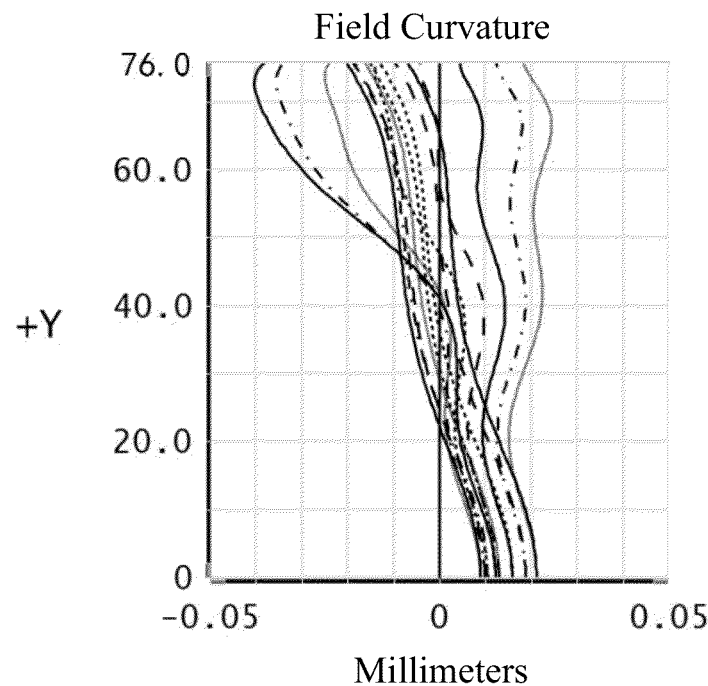
FIG. 17 is a field curvature diagram of the wide-angle lens in the fourth embodiment of the disclosure.
Figure 18:
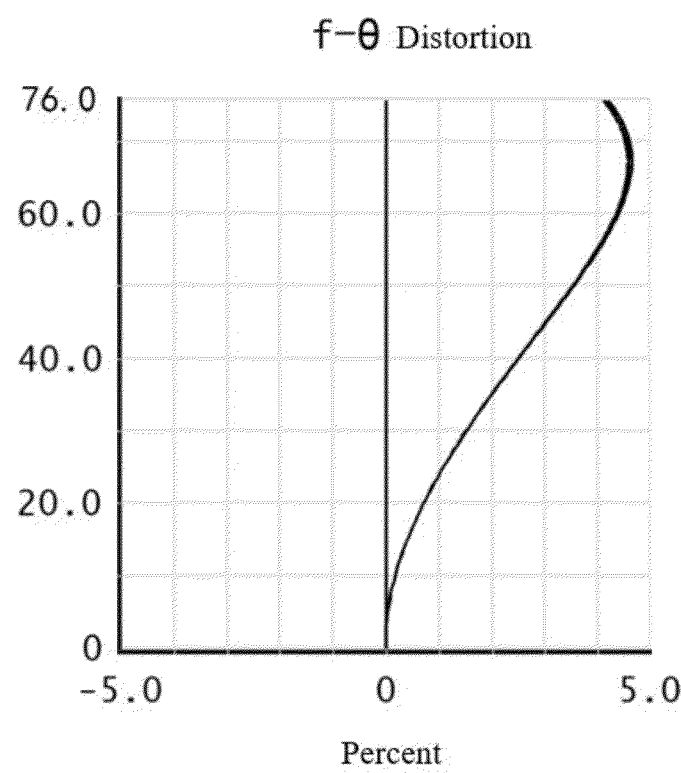
FIG. 18 is a distortion diagram of the wide-angle lens in the fourth embodiment of the disclosure.
Figure 19:
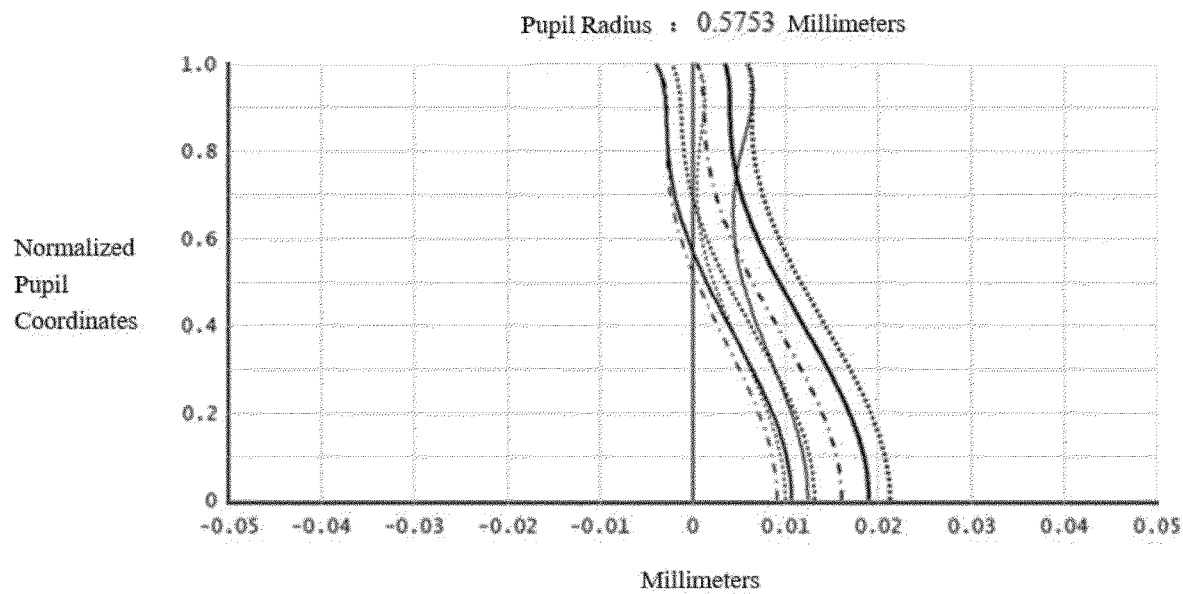
FIG. 19 is an axial chromatic aberration diagram of the wide-angle lens in the fourth embodiment of the disclosure.
Figure 20:
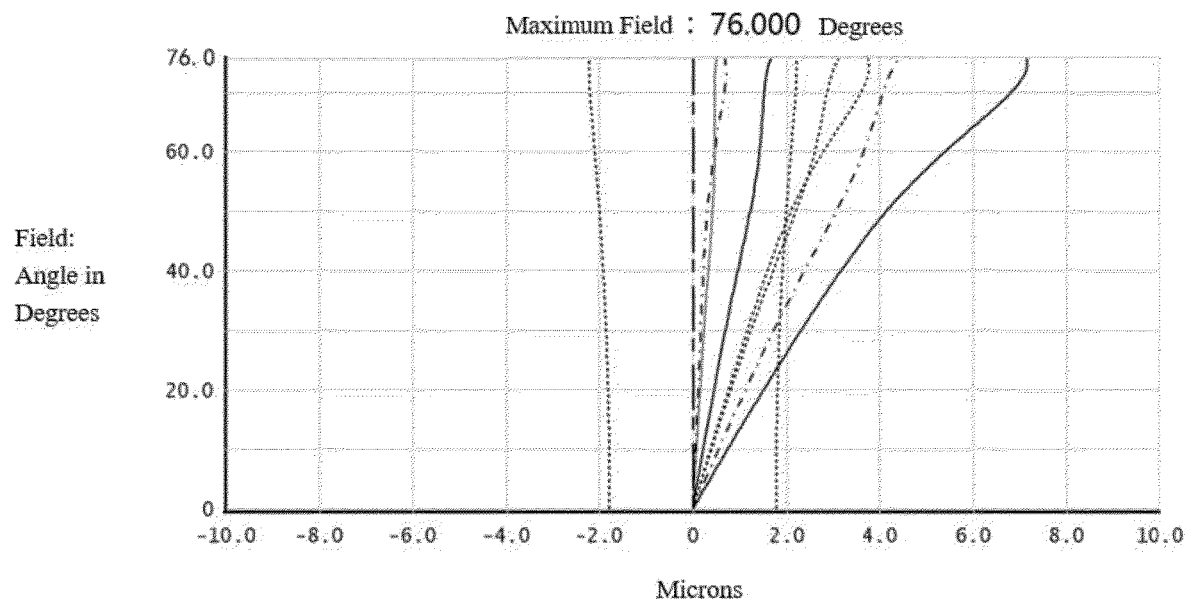
FIG. 20 is a lateral chromatic aberration diagram of the wide-angle lens in the fourth embodiment of the disclosure.

Please refer to FIG. 16, which is a structural diagram of a wide-angle lens 400 provided in this embodiment. The wide-angle lens 400 in this embodiment is substantially similar to the wide-angle lens 100 in the first embodiment expect that: in this embodiment, an object side surface S3 of a second lens L2 of the wide-angle lens 400 is a concave surface, a third lens L3 is an aspheric lens, an object side surface S5 of a third lens L3 is a concave surface, a fourth lens L4 is a glass spherical lens, an object side surface S11 of a sixth lens L6 is a concave surface, and the radius of curvature and the materials of each lens are different.

Related parameters of each lens of the wide-angle lens 400 of this embodiment are shown in Table 7.

TABLE 7

| Surface No. | Surface type | Radius of curvature (mm) | Thickness (mm) | Refractive index | Abbe number |
|---|---|---|---|---|---|
| Object surface | Object surface | Infinity | Infinity | | |
| S1 | Spherical surface | 7.850299 | 0.599808 | 1.901 | 37.05 |
| S2 | Spherical surface | 2.735794 | 2.113919 | | |
| S3 | Aspheric surface | −6.598664 | 0.595051 | 1.693 | 53.20 |
| S4 | Aspheric surface | 20.000000 | 0.779857 | | |
| S5 | Aspheric surface | −7.828325 | 0.999818 | 2.001 | 25.44 |
| S6 | Aspheric surface | −5.291483 | 0.590894 | | |
| S7 | Spherical surface | −3.432958 | 0.799779 | 1.744 | 44.90 |
| S8 | Spherical surface | −3.236990 | −0.053517 | | |
| ST | Plane | Infinity | 0.512973 | | |
| S9 | Spherical surface | 107.094125 | 1.137718 | 1.593 | 68.53 |
| S10 | Spherical surface | −3.501658 | 1.220815 | | |
| S11 | Spherical surface | −40.123564 | 1.889085 | 1.593 | 68.53 |
| S12 | Spherical surface | −2.690545 | 0.449810 | 1.728 | 28.31 |
| S13 | Spherical surface | 8.345594 | 0.194798 | | |
| S14 | Aspheric surface | 6.055921 | 2.569291 | 1.497 | 81.52 |
| S15 | Aspheric surface | −4.882241 | 0.953293 | | |
| S16 | Spherical surface | Infinity | 0.500000 | 1.517 | 64.21 |
| S17 | Spherical surface | Infinity | 2.146659 | | |
| S18 | Imaging surface | Infinity | — | | |

The parameters of the aspheric surfaces of the lenses of this embodiment are shown in Table 8.

TABLE 8

| Surface No. | K | B | C | D | E | F |
|---|---|---|---|---|---|---|
| S3 | −41.452750 | 2.040887E−02 | −4.633477E−03 | 4.868993E−04 | −2.148743E−05 | 0 |
| S4 | −39.455715 | 4.363769E−02 | −9.863726E−03 | 1.108527E−03 | −9.316823E−05 | 0 |
| S5 | 11.330917 | 5.275545E−03 | −1.761242E−03 | 7.857923E−04 | −9.801349E−05 | 0 |
| S6 | 0.966853 | 5.703618E−03 | 4.976551E−04 | 2.672419E−04 | 3.406941E−05 | 0 |
| S14 | −0.583670 | −1.279205E−03 | 8.710035E−05 | −8.358364E−06 | 1.377284E−07 | 0 |
| S15 | −1.547815 | 1.328657E−03 | −3.917785E−05 | 4.963032E−06 | −6.126652E−07 | 0 |

In this embodiment, the field curvature, the distortion, the axial chromatic aberration, and the lateral chromatic aberration are shown in FIG. 17, FIG. 18, FIG. 19, and FIG. 20, respectively. As can be seen from FIG. 17 to FIG. 20, the field curvature, the distortion, the axial chromatic aberration and the lateral chromatic aberration can be well corrected in this embodiment.

Fifth Embodiment

Figure 21:
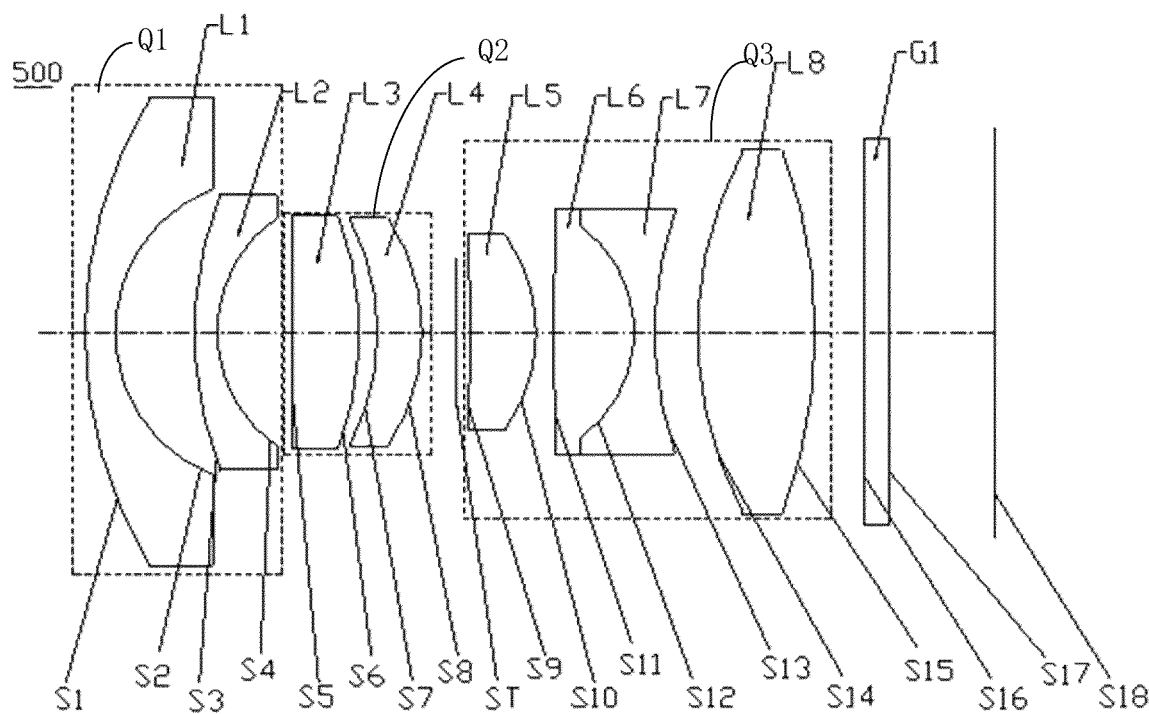
FIG. 21 is a schematic structural diagram of a wide-angle lens in a fifth embodiment of the disclosure.
Figure 22:
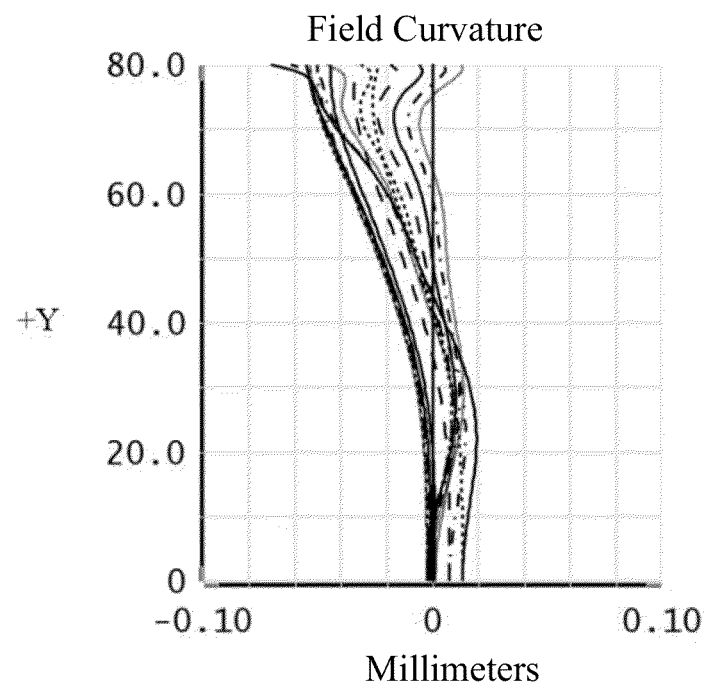
FIG. 22 is a field curvature diagram of the wide-angle lens in the fifth embodiment of the disclosure.
Figure 23:
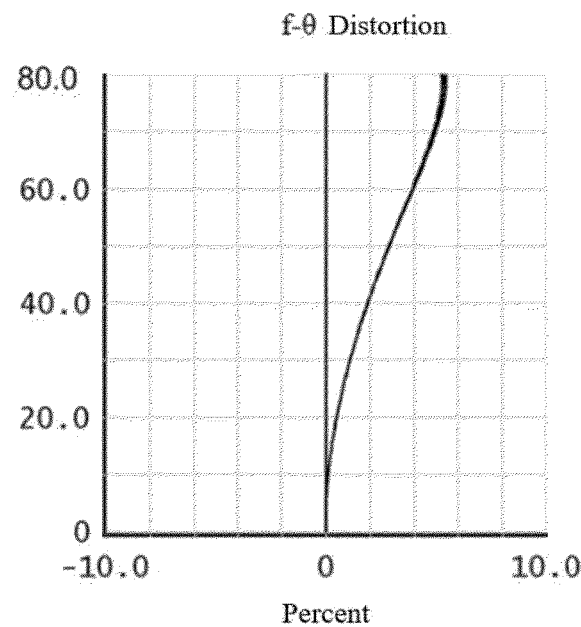
FIG. 23 is a distortion diagram of the wide-angle lens in the fifth embodiment of the disclosure.
Figure 24:
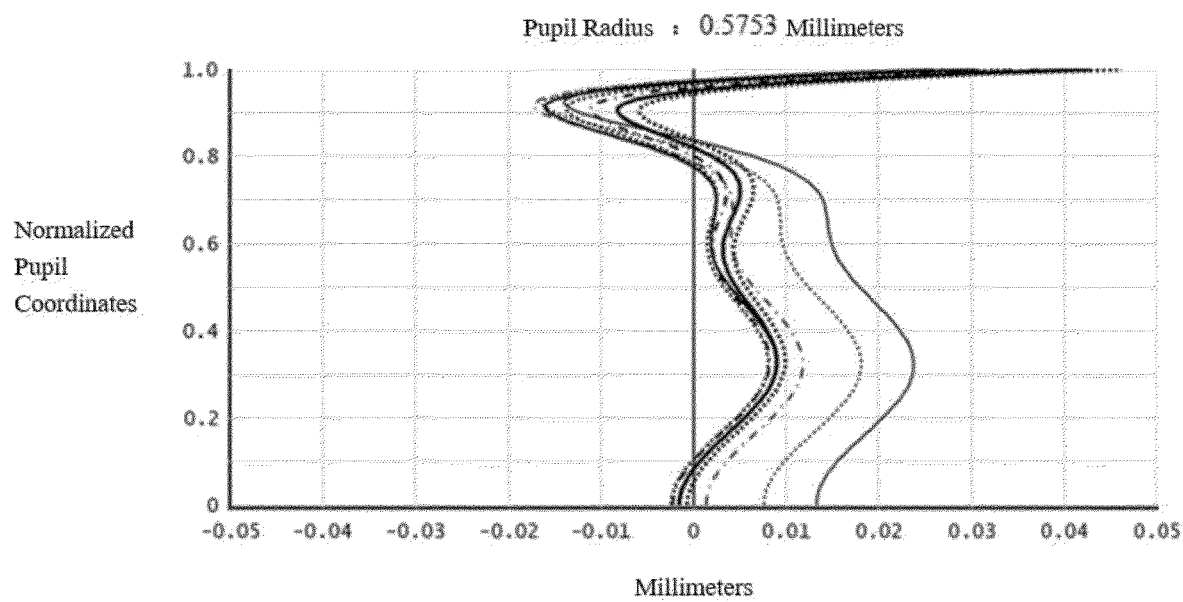
FIG. 24 is an axial chromatic aberration diagram of the wide-angle lens in the fifth embodiment of the disclosure.
Figure 25:
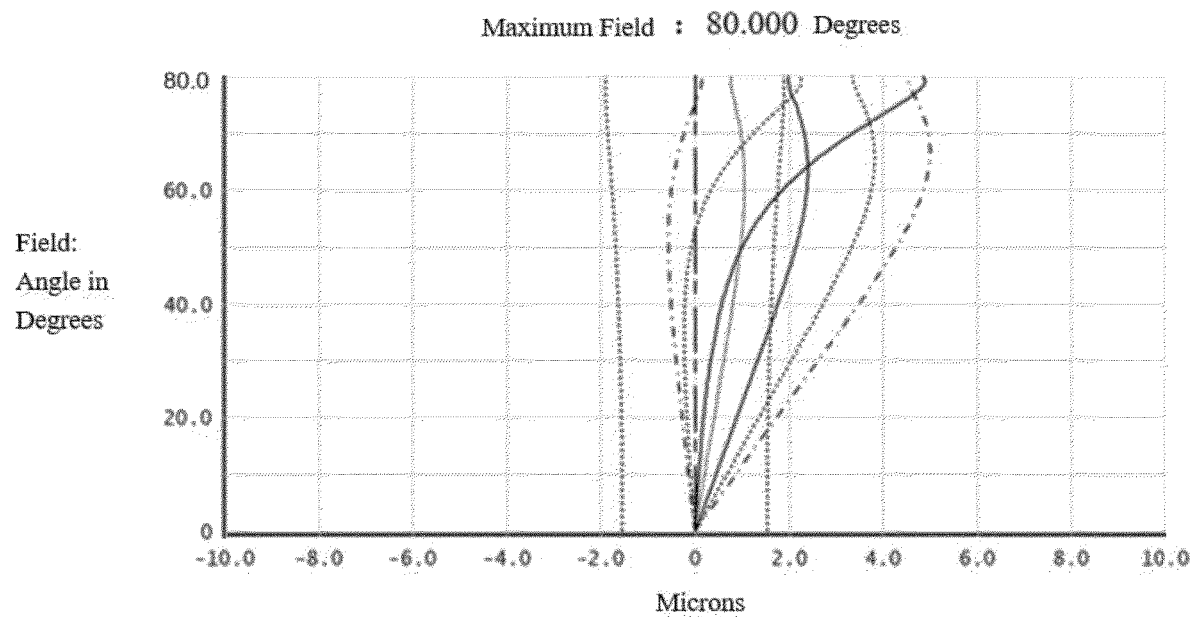
FIG. 25 is a lateral chromatic aberration diagram of the wide-angle lens in the fifth embodiment of the disclosure.

Please refer to FIG. 21, which is a structural diagram of a wide-angle lens 500 provided in this embodiment. The wide-angle lens 500 in this embodiment is substantially similar to the wide-angle lens 100 in the first embodiment expect that: in this embodiment, an object side surface S5 of a third lens L3 of the wide-angle lens 500 is a concave surface, a fourth lens L4 is a glass spherical lens, a fifth lens L5 is an aspheric lens, an object side surface S9 of a fifth lens L5 is a concave surface, and the radius of curvature and the materials of each lens are different.

Related parameters of each lens of the wide-angle lens 500 of this embodiment are shown in Table 9.

TABLE 9

| Surface No. | Surface type | Radius of curvature (mm) | Thickness (mm) | Refractive index | Abbe number |
|---|---|---|---|---|---|
| Object surface | Object surface | Infinity | Infinity | | |
| S1 | Spherical surface | 8.585405 | 0.598708 | 1.904 | 31.32 |
| S2 | Spherical surface | 2.949061 | 1.573005 | | |
| S3 | Aspheric surface | 5.269149 | 0.448267 | 1.851 | 40.10 |
| S4 | Aspheric surface | 2.477808 | 1.502184 | | |
| S5 | Spherical surface | −377.302280 | 1.310746 | 2.001 | 25.44 |
| S6 | Spherical surface | −6.367597 | 0.364246 | | |
| S7 | Spherical surface | −4.634040 | 0.885575 | 1.755 | 52.34 |
| S8 | Spherical surface | −3.980709 | 0.661341 | | |
| ST | Plane | Infinity | 0.307056 | | |
| S9 | Aspheric surface | −121.051603 | 1.289978 | 1.593 | 68.53 |
| S10 | Aspheric surface | −3.737597 | 0.333943 | | |
| S11 | Spherical surface | 49.387187 | 1.603193 | 1.593 | 68.53 |
| S12 | Spherical surface | −2.510176 | 0.408814 | 1.755 | 27.55 |
| S13 | Spherical surface | 7.016185 | 0.846017 | | |
| S14 | Aspheric surface | 6.263957 | 2.330074 | 1.554 | 71.72 |
| S15 | Aspheric surface | −7.819876 | 0.953293 | | |
| S16 | Spherical surface | Infinity | 0.500000 | 1.517 | 64.21 |
| S17 | Spherical surface | Infinity | 2.095256 | | |
| S18 | Imaging surface | Infinity | — | | |

The parameters of the aspheric surfaces of the lenses of this embodiment are shown in Table 10.

TABLE 10

| Surface No. | K | B | C | D | E | F |
|---|---|---|---|---|---|---|
| S3 | 1.340261 | 2.991893E−03 | −1.775365E−03 | 4.180770E−05 | 9.648726E−06 | −8.435431E−07 |
| S4 | −1.560853 | 2.095072E−02 | −1.236852E−03 | −3.614651E−04 | 8.945503E−05 | −7.901604E−06 |
| S9 | −6.149484 | −6.328989E−03 | 1.599788E−03 | −2.771085E−03 | 1.262841E−03 | −2.463878E−04 |
| S10 | 2.057185 | 1.670663E−03 | 9.122931E−05 | 1.190727E−04 | −2.618781E−05 | 2.661625E−06 |
| S14 | −4.241094 | −3.389738E−04 | 1.432276E−04 | −1.077700E−05 | 5.236857E−07 | −4.707371E−09 |
| S15 | −15.009260 | −3.032902E−03 | 2.710706E−04 | −9.714625E−06 | −1.381449E−07 | 2.648456E−08 |

In this embodiment, the field curvature, the distortion, the axial chromatic aberration, and the lateral chromatic aberration are shown in FIG. 22, FIG. 23, FIG. 24, and FIG. 25, respectively. As can be seen from FIG. 22 to FIG. 25, the field curvature, the distortion, the axial chromatic aberration and the lateral chromatic aberration can be well corrected in this embodiment.

Table 11 shows the above five embodiments and their corresponding optical characteristics, including the system focal length f, the aperture number F #, the field of view 2θ, the total optical length TTL, and the values corresponding to each of the above expressions.

TABLE 11

| Condition | First embodiment | Second embodiment | Third embodiment | Fourth embodiment | Fifth embodiment |
|---|---|---|---|---|---|
| f (mm) | 2.669 | 2.671 | 2.868 | 2.761 | 2.770 |
| F# | 2.500 | 2.400 | 2.200 | 2.000 | 2.400 |
| 2θ(deg) | 160.0 | 155.0 | 151.0 | 152.0 | 160.0 |
| TTL (mm) | 18.0 | 18.0 | 18.0 | 18.0 | 18.0 |
| $r_7/f_7 + r_8/f_8$ | 0.000 | 0.000 | 0.000 | 0.000 | 0.000 |
| $r_7/f_7 - r_8/f_8$ | 1.783 | 1.783 | 0.917 | 1.501 | 1.522 |
| $r_{10}/f_{10} + r_{12}/f_{12}$ | −1.087 | −1.203 | −1.193 | −1.193 | −1.193 |
| $(r_2 + r_4)/f_{Q1}$ | −2.207 | −2.290 | −5.034 | −9.223 | −2.311 |
| $(f_{L3} + f_{L4})/f_{Q2}$ | −0.482 | −6.705 | 7.281 | 4.245 | 5.431 |
| $r_{13}/f_{13} + r_{14}/f_{14}$ | −0.228 | −0.152 | −0.267 | −0.239 | −0.210 |
| $(f_7 + f_2)/D$ | −0.379 | −0.452 | −0.752 | −0.435 | −0.535 |

In the above embodiments, the wide-angle lens provided by the disclosure can achieve the following optical indexes: (1) the field of view 2θ>150°, (2) the optical total length TTL≤18 mm, (3) the applicable spectral range is 400 nm~700 nm.

In summary; in the wide-angle lens provided by the disclosure, the first group mainly used for receiving lights and reducing the angle between the lights and the optical axis, so that the lights are nearly parallel to the optical axis after passing through the first group, which is beneficial to increase the relative aperture of the wide-angle lens and improve the relative illuminance of the wide-angle lens. The second group is mainly used for light convergence, and correction of aberrations such as spherical aberration and coma. The third group is mainly used to eliminate the effect of chromatic aberration, field aberration, and spherical aberration, and control the exit angle of the main ray.

Sixth Embodiment

Figure 26:
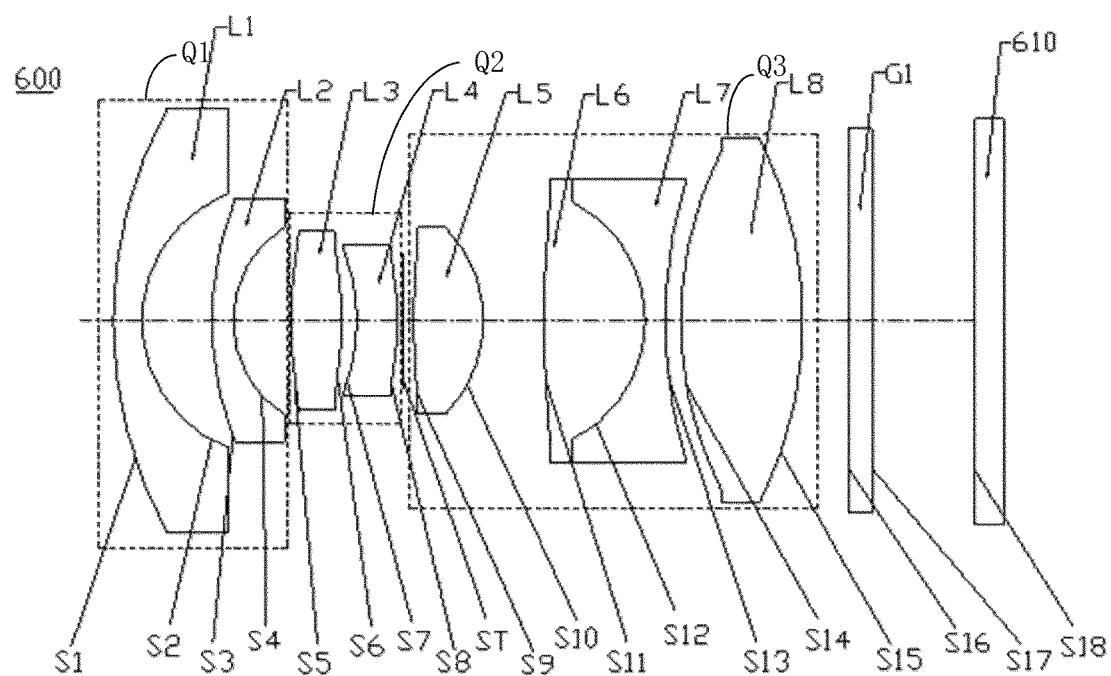
FIG. 26 is a schematic structural diagram of an imaging device in a sixth embodiment of the disclosure.

Please refer to FIG. 26, which is a structural diagram of an imaging device 600 provided by the embodiment. The imaging device 600 includes an imaging element 610 and a wide-angle lens in any of the foregoing embodiments, such as the wide-angle lens 100. The imaging element 610 may be a Complementary Metal Oxide Semiconductor (CMOS) image sensor, or a Charge Coupled Device (CCD) image sensor.

The imaging device 600 may be a motion camera, a video camera, a surveillance camera, a driving recorder, or any other form of an electronic device equipped with the wide-angle lens. The imaging device 600 provided by the disclosure includes the wide-angle lens.

Seventh Embodiment

Figure 27:
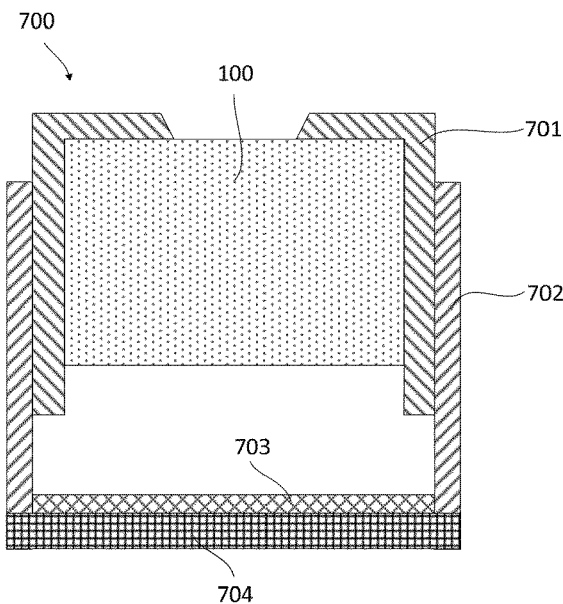
FIG. 27 is a schematic structural diagram showing a cross-section of the camera module in a seventh embodiment of the disclosure.

FIG. 27 illustrates a camera module 700. The camera module 700 includes the wide-angle lens (100, 200, 300, 400, 500, taking the wide-angle lens 100 as an example) as shown in any one of the above embodiments, a barrel 701, a holder 702, an image sensor 703, and a printed circuit board 704. The wide-angle lens 100 is received in the barrel 701, and the barrel 701 is engaged with the holder 702. The image sensor 703 and the printed circuit board 704 are substantially accommodated in the holder 702. The image sensor 703 is located on an imaging surface of the wide-angle lens 100 and is mounted on the printed circuit board 704. The image sensor 703 is configured for generating image data for the optical image sensed thereby: That is, the optical images formed by the wide-angle lens 100 can be converted into the image data and then transmitted to a processor. The image sensor 703 may be a Complementary Metal Oxide Semiconductor (CMOS) image sensor or a Charge Coupled Device (CCD) image sensor. The printed circuit board 704 can be further electrically connected to a chip or the processor via a flexible circuit board.

Eighth Embodiment

Figure 28:
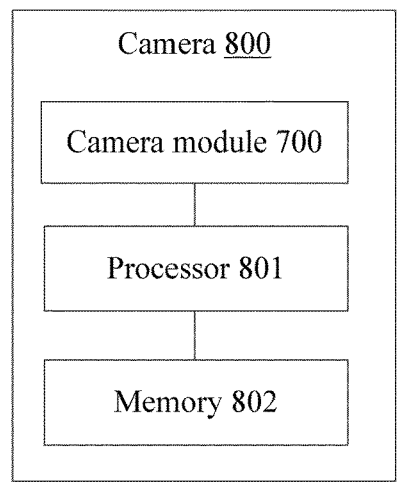
FIG. 28 is a schematic block diagram of a camera according to an eighth embodiment of the disclosure.

Please refer to FIG. 28, which is a block diagram of a camera 800. The camera 800 includes a camera module 700 as described above, a processor 801 and a memory 802. The camera module 700 is configured to capture images, the processor 801 is configured to process image data of the captured images, and the memory 802 is configured to store the image data of the captured images.

Figure 29:
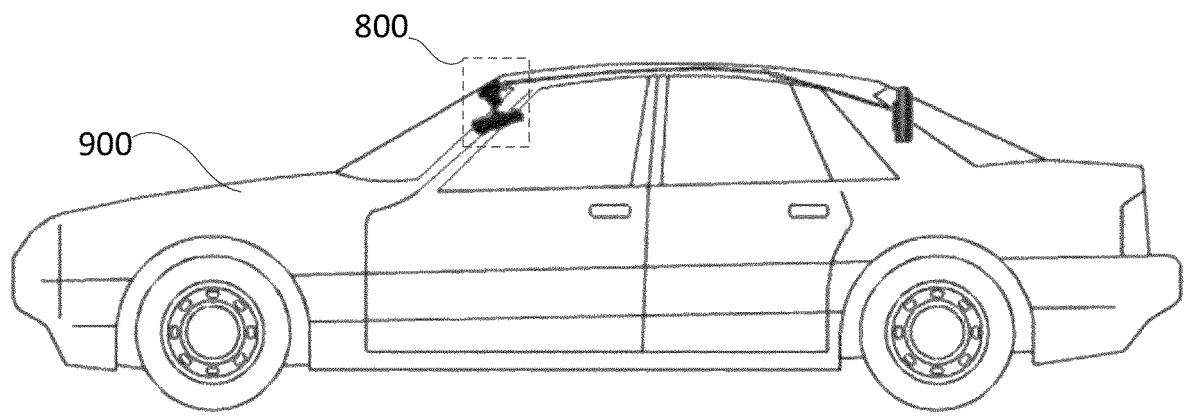
FIG. 29 is a schematic structural diagram of an application environment of the camera according to the eighth embodiment of the present disclosure.

As illustrated in FIG. 29, the camera 800 may be a vehicle camera. That is, the camera 800 may be installed in a car 900, and can be applied to an automatic driving system of the car 900.

In other embodiments, the camera 800 may be a motion camera.

In other embodiments, the camera 800 may be applied to a surveillance system.

In a summary, the imaging device 600, the camera module 700 and the camera 800 provided by the disclosure all includes the wide-angle lens. The wide-angle lens has the characteristics of wide angle of view; large aperture, and high imaging quality, so that the imaging device 600, the camera module 700 and the camera 800 each have the corresponding advantages of wide field of view, large aperture, and high quality imaging effect.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. A wide-angle lens, from an object side to an image side thereof, sequentially comprising:
   a first group with a negative refractive power, the first group comprising a first lens and a second lens from the object side to the image side, wherein the first lens has a negative refractive power, a convex object side surface and a concave image side surface, the second lens has a negative refractive power and a concave image side surface;
   a second group with a positive refractive power, the second group comprising a third lens and a fourth lens from the object side to the image side, wherein the third lens has a positive refractive power and a convex image side surface, the fourth lens has a positive refractive power, a concave object side surface, and a convex image side surface;
a stop;
a third group with a positive refractive power, the third group comprising a fifth lens, a sixth lens, a seventh lens, an eighth lens from the object side to the image side, wherein the fifth lens has a positive refractive power and a convex image side surface, the sixth lens has a positive refractive power and a convex image side surface, the seventh lens has a negative refractive power, a concave object side surface and a concave image side surface, the eighth lens has a positive refractive power, a convex object side surface and a convex image side surface, the sixth lens and the seventh lens form a cemented body; and
a filter, disposed between the third group and the image side;
wherein the first lens, the second lens, the third lens, the fourth lens, the fifth lens, the sixth lens, the seventh lens and the eighth lens are all glass lenses, and the wide-angle lens meets the expressions:

$-9.233 \leqq (r_2+r_4)/f_{Q1} \leqq -5.034;$ where $r_2$ represents a radius of curvature of the image side surface of the first lens, $r_4$ represents a radius of curvature of the image side surface of the second lens, $f_{Q1}$ represents a focal length of the first group.

2. The wide-angle lens as claimed in claim 1, wherein the wide-angle lens meets the expression:

$-2<r_{10}/f_{10}+r_{12}/f_{12}<0;$ where $r_{10}$ represents a radius of curvature of the image side surface of the fifth lens, $r_{12}$ represents a radius of curvature of the image side surface of the sixth lens, $f_{10}$ represents a back focal length the fifth lens, $f_{12}$ represents a back focal length of the sixth lens.

3. The wide-angle lens as claimed in claim 1, wherein the wide-angle lens meets the expression:

$-10<(f_{L3}+f_{L4})/f_{Q2}<10;$ where $f_{L3}$ represents a focal length of the third lens, $f_{L4}$ represents a focal length of the fourth lens, $f_{Q2}$ represents a focal length of the second group.

4. The wide-angle lens as claimed in claim 1, wherein the wide-angle lens meets the expression:

$-1<r_{13}/f_{13}+r_{14}/f_{14}<0;$ where $r_{13}$ represent a radius of curvature of the image side surface of the seventh lens, $r_{14}$ represents a radius of curvature of the object side surface of the eighth lens, $f_{13}$ represents a back focal length of the seventh lens, $f_{14}$ represents a front focal length of the eighth lens.

5. The wide-angle lens as claimed in claim 1, wherein an object side surface of the second lens is convex or concave.

6. The wide-angle lens as claimed in claim 1, wherein an object side surface of the third lens is convex or concave.

7. The wide-angle lens as claimed in claim 1, wherein the second lens and the eighth lens are both glass aspheric lenses.

8. The wide-angle lens as claimed in claim 1, wherein the wide-angle lens meets the expressions:

$d_1>d_2>d_3>d_4;$ $d_8>d_7>d_5;$ where $d_1$ represents a maximum diameter of the first lens, $d_2$ represents a maximum diameter of the second lens, $d_3$ represents a maximum diameter of the third lens, $d_4$ represents a maximum diameter of the fourth lens, $d_8$ represents a maximum diameter of the eighth lens, $d_7$ represents a maximum diameter of the seventh lens, $d_5$ represents a maximum diameter of the fifth lens.

9. The wide-angle lens as claimed in claim 1, wherein the wide-angle lens meets the expressions:

$2\theta>150°;$ $TTL\leq 18$ mm;

where $2\theta$ represents a field of view of the wide-angle lens, TTL represents a total optical length of the wide-angle lens.

10. A camera module, comprising a wide-angel lens and an image sensor, the image sensor located on an imaging surface of the wide-angle lens, wherein the wide-angle lens comprises:
a first group with a negative refractive power, the first group comprising a first lens and a second lens, wherein the first lens has a negative refractive power, a convex object side surface and a concave image side surface, the second lens has a negative refractive power and a concave image side surface;
a second group with a positive refractive power, the second group comprising a third lens and a fourth lens, wherein the third lens has a positive refractive power, a convex image side surface, the fourth lens has a positive refractive power, a concave object side surface, and a convex image side surface, the third lens is positioned between the second lens and the fourth lens;
a third group with a positive refractive power, the third group comprising a fifth lens, a sixth lens, a seventh lens, an eighth lens, wherein the fifth lens has a positive refractive power and a convex image side surface, the sixth lens has a positive refractive power and a convex image side surface, the seventh lens is a biconcave lens with a negative refractive power, the eighth lens is a biconvex lens with a positive refractive power, the sixth lens and the seventh lens are bonded together and positioned between the fifth lens and the eighth length;
a stop, disposed between the second group and the third group; and
a filter, disposed between the third group and the image sensor;
wherein each of the first lens to the eighth lens is a glass lens, and the wide-angle lens meets the expressions:

$-9.233 \leqq (r_2+r_4)/f_{Q1} \leqq -5.034;$ where $r_2$ represents a radius of curvature of the image side surface of the first lens, $r_4$ represents a radius of curvature of the image side surface of the second lens, $f_{Q1}$ represents a focal length of the first group.

11. The camera module as claimed in claim 10, wherein the wide-angle lens meets the expressions:

$-2<r_{10}/f_{10}+r_{12}/f_{12}<0;$ $-1<r_{13}/f_{13}+r_{14}/f_{14}<0;$ where $r_{10}$ represents a radius of curvature of the image side surface of the fifth lens, $r_{12}$ represents a radius of curvature of the image side surface of the sixth lens, $f_{10}$ represents a back focal length of the fifth lens, $f_{12}$ represents a back focal length of the sixth lens, $r_{13}$ represent a radius of curvature of the image side surface of the seventh lens, $r_{14}$ represents a radius of curvature of the object side surface of the eighth lens, $f_{13}$ represents a back focal length of the seventh lens, $f_{14}$ represents a front focal length of the eighth lens.

12. The camera module as claimed in claim 10, wherein the wide-angle lens meets the expressions:

$$-10 < (f_{L3} + f_{L4})/f_{Q2} < 10;$$

where $f_{L3}$ represents a focal length of the third lens, $f_{L4}$ represents a focal length of the fourth lens, $f_{Q2}$ represents a focal length of the second group.

13. The camera module as claimed in claim 10, wherein the wide-angle lens meets the expressions:

$$2\theta > 150°;$$

$$TTL \leq 18 \text{ mm};$$

where $2\theta$ represents a field of view of the wide-angle lens, TTL represents a total optical length of the wide-angle lens.

14. The camera module as claimed in claim 10, wherein the wide-angle lens meets the expressions:

$$d_1 > d_2 > d_3 > d_4;$$

$$d_8 > d_7 > d_5;$$

where $d_1$ represents a maximum diameter of the first lens, $d_2$ represents a maximum diameter of the second lens, $d_3$ represents a maximum diameter of the third lens, $d_4$ represents a maximum diameter of the fourth lens, $d_8$ represents a maximum diameter of the eighth lens, $d_7$ represents a maximum diameter of the seventh lens, $d_5$ represents a maximum diameter of the fifth lens.

15. The camera module as claimed in claim 10, wherein an object side surface of the second lens is convex or concave, an object side surface of the third lens is convex or concave.

16. The camera module as claimed in claim 10, wherein the second lens and the eighth lens are both glass aspheric lenses.

17. A camera, comprising a camera module, a processor, and a memory, the memory and the camera module being electrically connected with the processor, the memory being configured to store image data, the processor being configured to process the image data, the camera module comprising a wide-angle lens and an image sensor, the image sensor being opposite to the wide-angle lens and configured to sense and generate the image data; from an object side to an imaging surface, the wide-angle lens sequentially comprises:

a first lens, having a negative refractive power, a convex object side surface, and a concave image side surface;

a second lens, having a negative refractive power and a concave image side surface;

a third lens, having a positive refractive power and a convex image side surface;

a fourth lens, having a positive refractive power, a concave object side surface and a convex image side surface;

a stop;

a fifth lens, having a positive refractive power and a convex image side surface;

a cemented body, comprising a sixth lens and a seventh lens, wherein the sixth lens has a positive refractive power, a convex image side surface, the seventh lens has a negative refractive power, a concave object side surface and a concave image side surface;

an eighth lens, having a positive refractive power, a convex object side surface and a convex image side surface; and a filter;

wherein each of the first lens to the eighth lens is a glass lens, and the wide-angle lens meets the expressions:

$$-9.233 \leq (r_2 + r_4) F_{O1} \leq -5.034;$$

where $r_2$ represents a radius of curvature of the image side surface of the first lens, $r_4$ represents a radius of curvature of the image side surface of the second lens, $f_{O1}$ represents a focal length of a first group constituted by the first and second lenses.

* * * * *